United States Patent
Wieczorek et al.

(10) Patent No.: US 8,845,897 B2
(45) Date of Patent: Sep. 30, 2014

(54) DRAIN VALVE FOR FILTER SERVICE AND METHOD

(75) Inventors: Mark Wieczorek, Cookeville, TN (US); Wassem Abdalla, Cookeville, TN (US); Peter K. Herman, Stoughton, WI (US); Abby True-Dahl, Sparta, TN (US); Pierrick Bonzi, Tregunc (FR); Arnaud Le Ven, Ergué Gabéric (FR); Gérard Malgorn, Quimper (FR)

(73) Assignee: Cummins Filtration IP, Inc., Minneapolis, MN (US)

(*) Notice: Subject to any disclaimer, the term of this patent is extended or adjusted under 35 U.S.C. 154(b) by 1097 days.

(21) Appl. No.: 12/141,313

(22) Filed: Jun. 18, 2008

(65) Prior Publication Data

US 2008/0308481 A1   Dec. 18, 2008

Related U.S. Application Data

(60) Provisional application No. 60/944,622, filed on Jun. 18, 2007.

(51) Int. Cl.
  *B01D 27/08* (2006.01)
  *B01D 35/153* (2006.01)

(52) U.S. Cl.
  CPC ........ *B01D 35/153* (2013.01); *B01D 2201/291* (2013.01)
  USPC ........... 210/248; 210/232; 210/236; 210/464; 210/465

(58) Field of Classification Search
  USPC ........................................ 210/232–238, 248
  See application file for complete search history.

(56) References Cited

U.S. PATENT DOCUMENTS

| | | | | |
|---|---|---|---|---|
| 3,920,553 A | * | 11/1975 | Cilento | 210/232 |
| 5,888,384 A | * | 3/1999 | Wiederhold et al. | 210/130 |
| 6,015,492 A | * | 1/2000 | Popoff et al. | 210/238 |
| 6,565,746 B1 | * | 5/2003 | Stamey et al. | 210/248 |
| 6,585,889 B2 | * | 7/2003 | Weingaertner | 210/172.2 |
| 6,709,576 B2 | * | 3/2004 | Jokschas | 210/114 |
| 6,972,092 B1 | * | 12/2005 | Roll | 210/313 |
| 7,060,184 B2 | * | 6/2006 | Cline et al. | 210/248 |
| 7,297,255 B2 | * | 11/2007 | Stockbower | 210/175 |
| 7,390,407 B2 | * | 6/2008 | Weindorf et al. | 210/234 |
| 7,871,517 B2 | * | 1/2011 | Komine et al. | 210/248 |

FOREIGN PATENT DOCUMENTS

| | | |
|---|---|---|
| JP | 9-10515 A | 1/1997 |
| JP | 2004-167295 A | 6/2004 |
| KR | 10-2005-0032337 A | 4/2005 |
| KR | 10-2006-0069636 A | 6/2006 |
| WO | 2007/043669 | 4/2007 |

OTHER PUBLICATIONS

International Search Report of PCT/US2008/067328, dated Dec. 30, 2008.

(Continued)

*Primary Examiner* — Tony G SooHoo
*Assistant Examiner* — Peter Keyworth
(74) *Attorney, Agent, or Firm* — Foley & Lardner LLP

(57) ABSTRACT

A fluid filter is described, where a drain valve is configured to move back and forth into open and closed positions. The drain valve and a filter cartridge are in a structural arrangement such that the drain valve is put in an open position before the filter and/or a filter element therein can be serviced or replaced.

19 Claims, 14 Drawing Sheets

(56) References Cited

OTHER PUBLICATIONS

Written Opinion of the International Searching Authority of PCT/US2008/067328, dated Dec. 30, 2008.

Fleetguard brochure LT32661, "The User-Friendly Filter," 2007.

Office Action issued for Chinese patent application No. 200880020548.5, dated Jan. 31, 2012 (5 pages).

* cited by examiner

DRAIN VALVE FOR FILTER SERVICE AND METHOD

CROSS-REFERENCE TO RELATED APPLICATIONS

The present application claims the benefit of U.S. Provisional Patent Application Ser. No. 60/944,622 entitled "DRAIN VALVE FOR FILTER SERVICE AND METHOD," filed on Jun. 18, 2007, which is herewith incorporated by reference in its entirety.

FIELD

A drain valve for a fluid filter is disclosed, which can facilitate servicing the fluid filter and servicing a filter element of the fluid filter. For example, a drain valve is disclosed that must be opened before servicing the filter cartridge of the fluid filter.

BACKGROUND

Fluid filters are widely known and used. After use and wear, many fluid filters must eventually have their filter elements serviced and/or replaced, and many fluid filters themselves must be removed in order to be serviced and/or replaced. Filters used in lube systems, for example, often employ a screwdriver to impale a shell of the filter to drain the filter before removal. This method of servicing can be difficult in some cases, due to limited room around the filter and can be messy. In other examples, fuel filters such as those employed in high pressure comment rail (HPCR) fuel systems typically have a dedicated drain valve. However, the drain valve usually is not operated before a filter service, and often is a separate device which does not interact directly with the replaceable filter element. Further, such fluid filters do not have a drain valve that interacts directly with a portion of the filter. Thus, improvements can still be made to existing fluid filters and to existing filter servicing processes.

SUMMARY

The following technical disclosure describes an improved fluid filter. Generally, the fluid filter includes a drain valve structurally arranged with a filter cartridge in a configuration, such that a drain opening opens before the filter cartridge can be serviced. In some examples, the drain valve is configured to move back and forth into open and closed positions, such that the drain valve must be in the open position before the filter cartridge can be serviced and/or replaced.

Some benefits of such a fluid filter can include preventing a clean side of a filter system from becoming contaminated during the filter change process. The fluid filter herein can allow for a more "clean service" since unfiltered fluid can be removed before a housing of the filter is opened. As a result, a filter can be provided that is more environment friendly and is more pleasing to customers and users. The filter described herein can also prevent the assembly of an incorrect filter element in the filter, due to a particular connective configuration of the filter and the drain valve. Further, the drain valve can be positioned in such a way that it physically prevents opening the filter housing, so as to guide a service person to first open the drain valve and perform filter servicing in the correct sequence.

In one embodiment, a filter includes a housing and a filter cartridge disposed inside the housing. The housing includes a filter head connected at one end and a drain valve connected at another end opposite the filter head. The filter cartridge includes a filter element having a filter media and endplates at first and second ends of the filter media. The filter media is configured to filter fluid therethrough from an unfiltered side of the filter media to a filtered side of the filter media. At least the filter element is replaceable. The drain valve is engaged directly with the filter head, where the drain valve is configured to move back and forth into open and closed positions, and such that the drain valve must be in the open position before the filter can be serviced and/or replaced.

In one embodiment, the drain valve is configured to connect directly to a center tube of the filter cartridge and be sealed with the housing. In one example, the drain valve is in a fluid tight seal with the housing when the drain valve is in the closed position. The fluid tight seal can be released when the drain valve is in the open position.

In another embodiment, the drain valve is configured to connect directly to the housing and be sealed with one endplate of the filter cartridge. The drain valve is in a fluid tight seal with the endplate when the drain valve is in the closed position. In another example, the drain valve also is in a fluid tight seal with the housing when the drain valve is in the closed position. The fluid tight seal can be released when the drain valve is in the open position. In yet another embodiment, the drain valve is connected directly to one endplate of the filter cartridge and sealed with the housing. The fluid tight seal can be released when the drain valve is in the open position.

In another embodiment, the drain valve and housing are in an engagement, such that the drain valve is disposed at one end of the housing in an offset position with respect to a center axis between ends of the housing. In yet another embodiment, the drain valve includes a lever connected to the drain valve. The lever is configured to open and close the drain valve. The lever is configured to physically prevent opening the filter housing, so as to guide a user or service person to first open the drain valve and perform filter servicing in the correct sequence.

BRIEF DESCRIPTION OF THE DRAWINGS

FIG. 6 is an end view of the fluid filter. FIG. 7 is a partial side view of the fluid filter. FIG. 8 is another partial side view of the fluid filter.

DETAILED DESCRIPTION

The fluid filters described herein can generally provide an improved structure for servicing the fluid filter, where a drain valve is structurally arranged with the filter cartridge, such that a drain opening opens before the filter cartridge can be serviced. As will be described herein, a filter cartridge that is housed by the fluid filter can be better serviced, wherein the servicing operation is controlled in response to someone operating a drain valve for draining unfiltered fluid collected in the fluid filter. For example, when the drain valve is operated and placed in the "drain" (open) position, the drain valve disengages a seal between the drain valve and another portion of the filter. Unfiltered fluid can then be released through the drain valve, and the filter cartridge becomes free to be removed and replaced by a new filter cartridge. After installation of a new filter cartridge, the drain valve can be placed in the closed position to reengage the seal and hold the filter cartridge in place.

Figure 1:
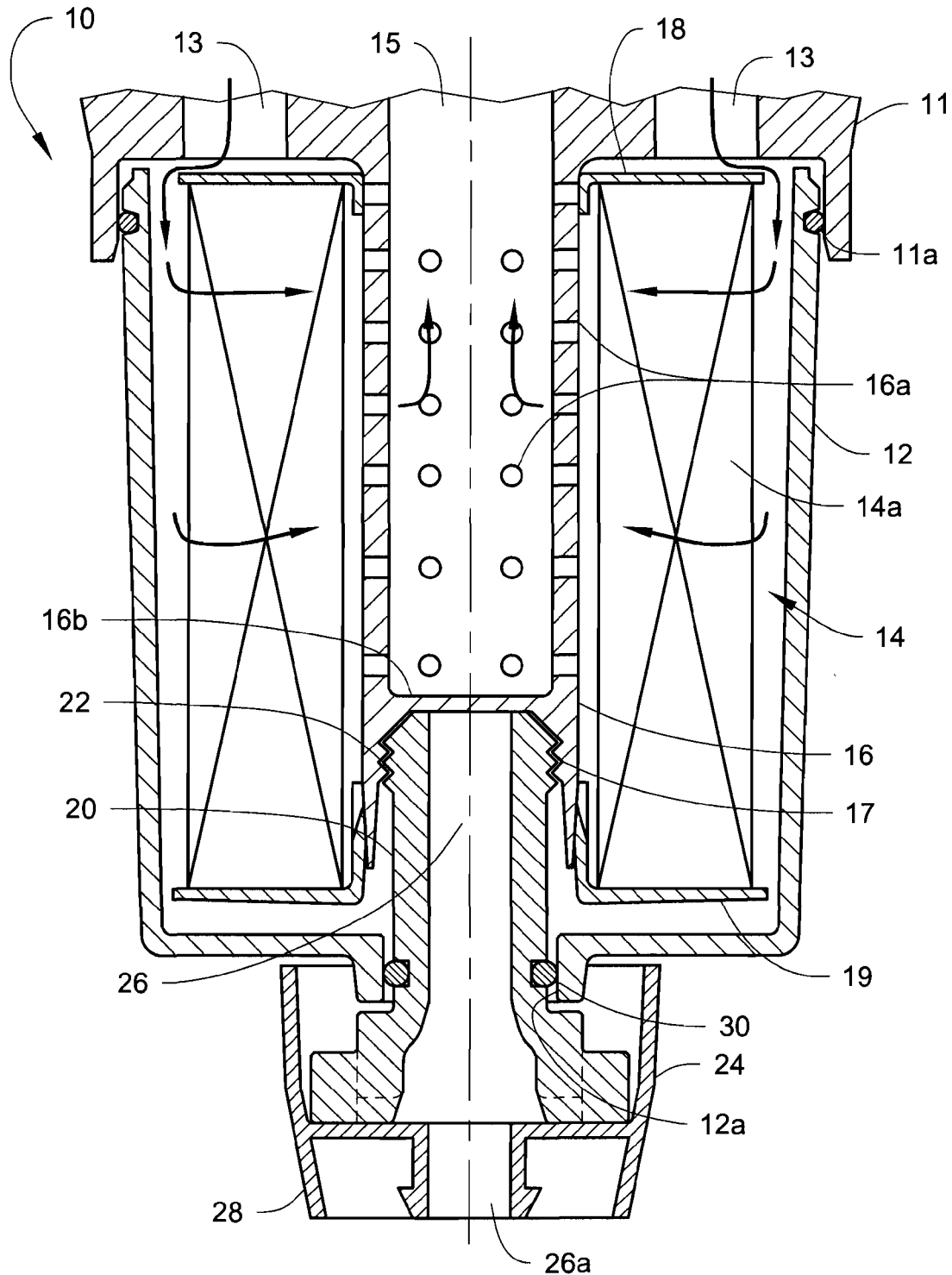
FIG. 1 illustrates a side sectional view of one embodiment of a fluid filter having a drain valve connected thereto.

FIG. 1 illustrates one embodiment of a fluid filter 10 having a drain valve 20 connected thereto. The fluid filter 10 includes a housing 12 with a filter head 11 connected at one end of the housing 12 that is generally open. The filter head 11 sealingly engages with the housing through a seal 11a. In one example, the seal 11a is a resilient o-ring disposed in a groove about an outer surface of the housing. The seal 11a provides fluid tight seal between the housing 12 and the filter head 11. It will be appreciated that the seal 11a is not limited to the specific structure shown and may be modified as suitable and/or necessary by one of skill in the art.

The drain valve 20 is engaged with the housing 12 at an end opposite the end that the filter head 11 is connected. The drain valve 20 can be opened and closed to allow unfiltered fluid to be released or drained from the fluid filter, and is further described below.

The housing 12 contains a filter cartridge containing a filter element 14. The filter element 14 includes filter media 14a configured to allow a working fluid entering the fluid filter 10 to filter from one side of the filter media 14a to another side of the filter media 14a and allow the working fluid to flow out of the fluid filter 10. The filter head 11 is configured as a cap or lid structure with openings 13 to allow fluid that is to be filtered to enter the fluid filter 10, and with an opening 15 to allow fluid that has been filtered to exit the fluid filter 10 and complete the flow path therethrough (See direction of arrows in FIG. 1).

It will be appreciated that "fluid to be filtered" is meant as any working fluid requiring filtration in a process or system, such as but not limited to fuel, oil, coolant, or the like. As one particular example, the fluid to be filtered by the fluid filter 10 is a working fluid used in high pressure common rail fuel systems.

The filter cartridge also includes endplates 18 and 19 connected to the filter element 14. The endplates 18, 19 can sealingly engage the filter head 11. As shown in FIG. 1, the filter head 11 includes a center tube 16 that extends into the housing 12. The endplates 18, 19 each include an annular surface that engages an outer annular surface of the center tube 16 in a fluid tight seal. It will be appreciated that the sealing engagement between the endplates 18, 19 and the center tube 16 may be accomplished in a variety of ways as one of skill in the art can construct, and may include examples such as but not limited to various configurations of o-ring seals, gasket configurations, and an interference-type fit.

Between sealing engagement of the center tube 16 and the end plates 18, 19, the center tube includes apertures 16a cooperating with the flow path of the fluid filter. The apertures 16a allow filtered fluid passing through the filter media 14a to enter the center tube and exit the opening 15 of the filter head 11.

FIG. 1 shows the drain valve 20 engaged with the housing 12 and connected to the center tube 16 of the filter head 11. In one embodiment, the drain valve 20 is engaged with the housing 12 at an opening 12a of the housing and at an end opposite the end that the filter head 11 is connected. In one example, the opening 12a is significantly smaller than the generally open opposite end, where the opening 12a is configured for attachment of a valve, such as drain valve 20.

The drain valve 20 is sealingly engaged with the housing 12 through a seal 30. In one example, the seal 30 is an o-ring seal disposed in a groove about an outer annular surface of the drain valve 20. The seal 30 engages an annular surface created by the opening 12a of the housing in a fluid tight seal. It will be appreciated that during operation of the drain valve 20, the fluid filter 10 and drain valve 20 can remain engaged via friction or interference of the seal 30 on the filter housing 12. It further will be appreciated that the fluid filter 10 and drain valve 20 may remain engaged by a variety of ways and is not limited to the specific o-ring structure shown. For example, a detent or other engagement could be used between the housing 12 and the drain valve 20, and which may be equally or more suitable.

The drain valve 20 is releasably connected to the center tube 16 of the filter head 11. In one embodiment, the drain valve 20 is attached to a distally positioned end of the center tube 16. As shown, the distally positioned end is separated from the filtered fluid portion of the flow path by a wall 16b. The drain valve 20 includes a head that can sealingly engage with the wall 16b when the drain valve 20 is in the closed position.

The distally positioned end of the center tube 16 includes an extended boss section receivable for an end of the drain valve 20. As one example only, the drain valve 20 includes outer threads 22 that can releasably engage with inner threads 17 on an inner surface of the extended boss section of the center tube 16. In this configuration, when the thread 17, 22 are engaged, the entire fluid filter 10 can be held in place, where the drain valve 20 secures to the center tube 16, holds down (or "clamps") the filter head 11 onto the housing 12, and keeps the filter cartridge in place. As a result, the drain valve 20 is indirectly engaged or connected with the filter cartridge, and acts as a fastener to hold the filter head 11 to the housing 12. It will be appreciated that the engagement between the filter head 11 and the drain valve 20 is not limited to the specific threaded structure shown, and that other engagements may be employed that do not include a threaded engagement, so long as the drain valve 20 can secure the filter cartridge and can be moved to an open and closed relationship with the filter head 11.

The drain valve 20 includes at least one flow opening 26 to allow flow of unfiltered fluid through its body and through a drain hole 26a. The flow opening 26 and drain hole 26a remain closed so as not to allow unfiltered fluid to flow through the drain valve 20, until the drain valve 20 is moved to an open position.

To move the drain valve 20 into an open position, an actuator 28 is employed. In one embodiment, the actuator 28 is a knob connected to the drain valve 20, and is rotatable to both open and close the drain valve 20. By rotating the actuator 28 in one direction, the engagement between the drain valve 20 and the center tube 16 can be released. In one embodiment, the seal between the head of the drain valve 20 and the wall 16b of the center tube 16 may become disengaged by at least partially releasing or loosening the threaded engagement between the drain valve 20 and the filter head 11. As another example, the threaded engagement may be completely removed to further open the flow opening 26 of the drain valve 20 and allow for removal of the filter head 11 and the filter element 14. By rotating the drain valve 20 in an opposite direction, the sealing engagement between the drain valve 20 and the center tube 16 can be restored.

As shown the drain valve 20 must be in an open or "drain" position for the fluid filter 10 to be serviced. By the connective configuration between the fluid filter 10 and the drain valve 20, the drain valve 20 must be opened (and unfiltered fluid allowed to drain), in order to detach the filter head 11 and access the filter cartridge. That is, unfiltered fluid must be allowed to drain through the drain valve 20, prior to servicing the fluid filter 10, since the drain valve 20 is what keeps the filter cartridge in place via its interface with the center tube 16 of the filter head 11.

FIG. 1 shows the fluid filter 10 in the closed position, such that no unfiltered fluid is allowed through the drain hole 26a of the drain valve 20. It will be appreciated that the drain valve 20 may be moved to the open position and back to its closed position when desired and as described. It further will be appreciated that "unfiltered fluids" is meant as fluid on the unclean or "dirty" side of the filter element 14, and can include but is not limited to water, an unfiltered working fluid such as described, other contaminants, or the like.

Figure 2:
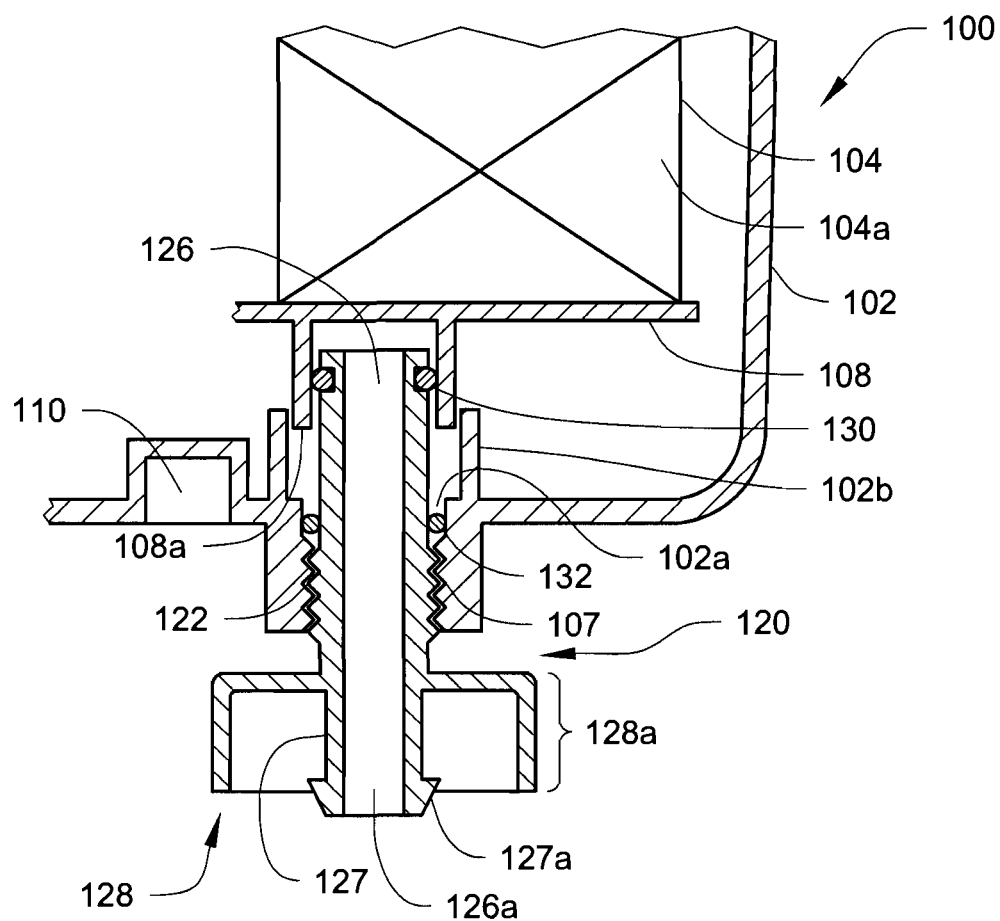
FIG. 2 illustrates a partial side sectional view of another embodiment of a fluid filter having a drain valve connected thereto.
Figure 3:
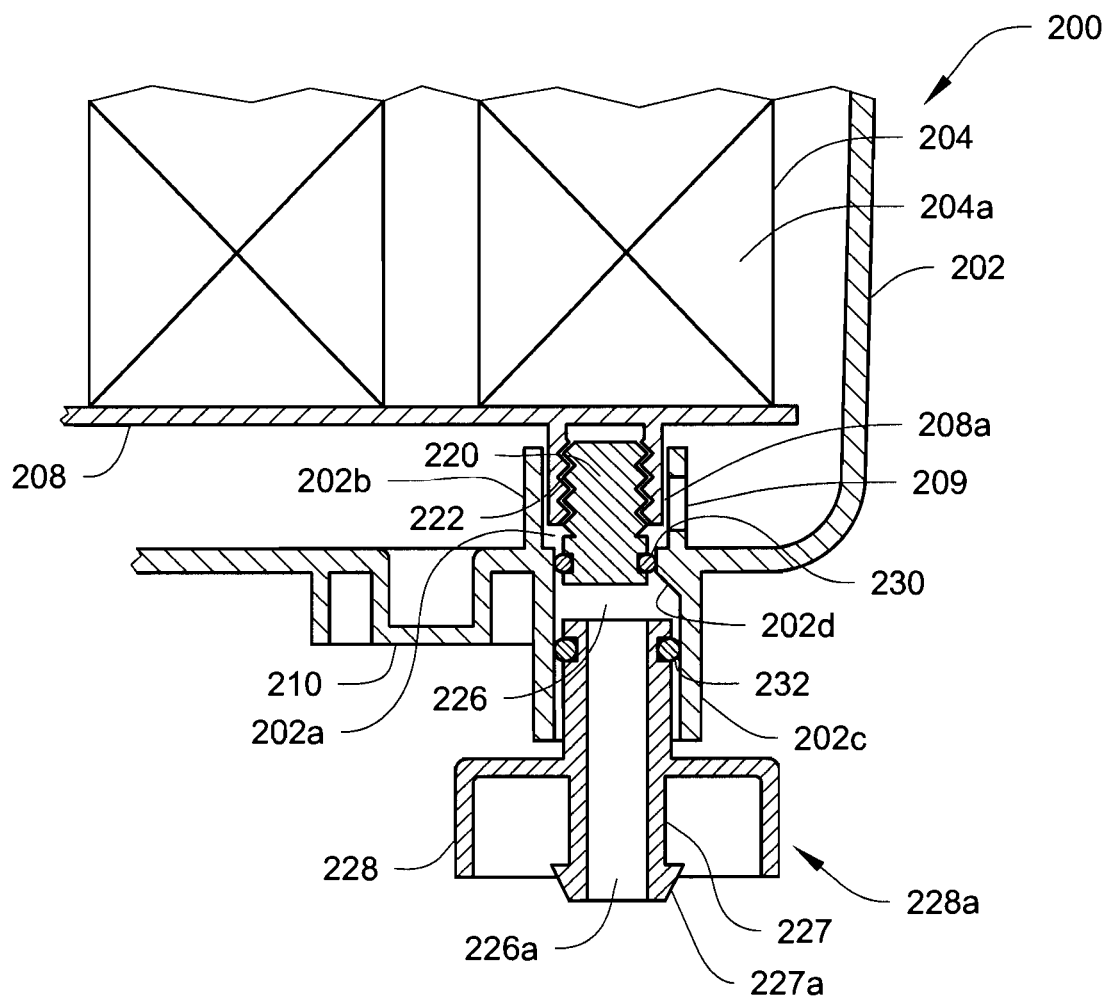
FIG. 3 illustrates a partial side sectional view of another embodiment of a fluid filter having a drain valve connected thereto.

In another embodiment, a drain valve can be attached or sealed directly to a portion of the filter cartridge, such as the lower endplate. As with drain valve 20, such a valve must be opened and released from engagement with the filter element, before the filter element can be replaced. Such a construction can be advantageous in that a "clean service" may be performed, as well as helping to ensure that the dirty fluid is removed from the housing before the filter element is serviced. This can further prevent contamination of the clean side of the filter system. Such a fluid filter can be useful with a variety of filter systems, and particularly those employed for example in high pressure common rail fuel systems. FIGS. 2 and 3 illustrate additional embodiments where a drain valve 100, 200 is directly sealed or attached to the filter cartridge.

FIG. 2 shows one embodiment of a fluid filter 100 having a drain valve 120 sealed to a filter cartridge and releasably attached with a housing 102. The fluid filter 100 is shown as a partial side sectional and is not fully illustrated. It will be appreciated that the fluid filter 100 may employ a similar construction as fluid filter 10, but for the drain valve 120 connection to the fluid filter 100 and the descriptions detailed herein.

As shown, the filter cartridge includes a filter element 104 with a filter media 104a, which may be constructed and function similar to filter media 14a above. The filter element 104 includes an endplate 108. In one embodiment, the drain valve 120 is engaged with the endplate 108. The endplate 108 includes a protruding boss structure 108a extending away from the endplate 108. The boss structure 108a forms a pocket-like configuration that is receivable for a head portion of the drain valve 120. FIG. 2 shows a seal 130 provided between an inner annular surface of the boss structure 108a and the drain valve 120. In one embodiment, the seal 130 is disposed on the outer annular surface proximate the head portion. The seal 130 provides a fluid tight seal that prevents unfiltered fluid from entering and exiting the drain valve 120, when the drain valve 120 is in a closed position. The seal 130 can be released as will be described below.

The drain valve 120 is releasably attached to the housing 102. In one embodiment, the housing 102 includes an opening 102a having threads 107 disposed on its inner surface. The drain valve 120 can be inserted through the wall of the housing 102, through the opening 120a and into the pocket-like structure created by the protruding boss structure 108a. The drain valve 120 includes threads 122 disposed on its outer surface. The threads 122 of the drain valve 120 can threadedly engage the threads 107 of the housing, so that the drain valve 120 is connected to the housing 102. By this engagement, the drain valve 120 can be tightened onto the housing 102. Likewise, the drain valve 120 can be loosened and disconnected from the housing 102 by releasing the threaded engagement. It will be appreciated that the engagement between the housing 102 and the drain valve 120 is not limited to the specific structure shown, and that other releasable connections not including a threaded engagement may be employed as suitable and/or necessary.

In one embodiment, the housing 102 includes a protruding boss structure 102b. The protruding boss structure 102b extends toward the filter element 14 inside the housing 102. The protruding boss structure 102b is configured as a pocket-like structure, and is at least partially receivable of the protruding boss structure 108a. As one example, the protruding boss structure 108a of the filter element 104 locates in the pocket-like configuration of the boss structure 102b of the housing 102.

As shown, the location of the drain valve 120 with respect to the boss structures 102b, 108a is off center from a center axis (not shown) of the entire fluid filter 100. That is, the drain valve 120 is positioned at the end of the fluid filter 100 and toward one side or area, rather than at a center location. The boss structures 102b, 108a of the filter housing 102 and filter element 104 and their placement also act as a key feature to orient the filter element 104 within the housing 102. In such a configuration, the key feature helps ensure that a filter element is properly loaded in the housing. Further, the key feature helps ensure that the proper filter element is loaded, as the loading orientation requires a particular construction of filter element for the fluid filter 100.

In yet another embodiment, another seal 132 can be disposed on the outer annular surface of the drain valve 120 and distal to the seal 130. The seal 132 engages the drain valve 120 and an inner annular surface of the opening 102a of the housing 102 in a fluid tight seal, so that substantially no liquid fluid escapes. In one embodiment, the interface between the outer annular surface of the drain valve and the inner annular surface of the housing 102 may also function as an air vent. Such a configuration would allow air to enter the housing when the seal 132 is released, and can help facilitate the release of unfiltered fluid through the opening 126 and drain hole 126a of the drain valve 120, when the drain valve 120 is in the open or "drain" position.

The drain valve 120 can be moved to open and closed positions by an actuator 128. In one embodiment, the actuator 128 is a knob-like structure connected to the drain valve 120, and can be rotated to move the drain valve to both open and closed positions. In one example, the actuator 128 includes a grip surface 128a that facilitates rotation by a user so he/she can easily grab a hold of the actuator and turn it.

By rotating the actuator 128 in one direction, the sealing engagement between the drain valve 120 and the filter cartridge can be released. In one embodiment, the seal 130 between the outer surface of the drain valve 120 and the inner surface of the protruding boss structure 108a is released. By at least partially releasing or loosening the threaded engagement between the drain valve 120 and the housing 102, the head portion of the drain valve 120 moves downward or away from the protruding boss structure 108a and out of its pocket-like configuration. When the seal has been released, unfiltered fluid is allowed to move around the boss structures 102b, 108a and into at least one opening 126 of the drain valve 120 and continue to move through the stem and hose portions 127.

The unfiltered fluid may then flow and exit the drain hole 126a. In one embodiment, the unfiltered fluid enters a top of the head portion of the drain valve 120 when the seal is released.

In yet another embodiment, the drain valve 120 also includes a barbed end 127a at the end of the hose 127. The barbed end 127a can allow for attachment to various fluid lines if desired and/or necessary.

As another example, the threaded engagement may be completely removed, so that the drain valve 120 can be completely removed from engagement with the housing 102. Likewise, by rotating the drain valve 120 in an opposite direction, the sealing engagement between the drain valve 120 and the filter element 104 can be restored.

In yet another example, the filter element 104 may be pulled out of engagement with the drain valve 120, such as from the end opposite the end that the drain valve 120 is attached. As the filter element 104 is pulled out, the seal 130 can be released and unfiltered fluid may then access the flow opening 126 and exit the drain hole 126a.

FIG. 2 shows that the drain valve 120 must be in an open or "drain" position for the fluid filter 100 to be serviced. By the connective configuration between the fluid filter 100 and the drain valve 120, the drain valve 120 can be released from a sealing engagement with the filter element 104 (and unfiltered fluid allowed to drain), in order to service the fluid filter 100. That is, unfiltered fluid must be allowed to drain through the drain valve 120, prior to servicing the fluid filter 100, since the drain valve 120 seals with the filter element 104.

FIG. 2 shows the fluid filter 100 in the closed position, such that no unfiltered fluid is allowed through the drain hole 126a of the drain valve 120. It will be appreciated that the drain valve 120 may be moved to the open position and back to its closed position when desired and as described. It further will be appreciated that "unfiltered fluids" is meant as fluid on the unclean or "dirty" side of the filter element 104, and can include but is not limited to water, an unfiltered working fluid, other contaminants, or the like.

In yet another embodiment, the actuator 128 may also act to physically prevent the fluid filter from being replaced. In many fluid filters, a filter removal feature 110 is disposed on an outer surface of the housing 102. Typically, the filter removal feature 110 is constructed as an access to remove the filter. Oftentimes, a square socket wrench may be used, so that the housing 102 can be removed. As shown in FIG. 2, the actuator 128 of the drain valve 120 is positioned to physically block access to the filter removal feature 110. In this configuration, the housing 102 must be drained, and the drain valve 120 be removed from the housing 102 before the entire fluid filter 100 can be removed and changed.

FIG. 3 shows one embodiment of a fluid filter 200 having a drain valve 220 sealed to a housing 202 and releasably attached with a filter cartridge. The fluid filter 200 is shown as a partial side sectional and is not fully illustrated. It will be appreciated that the fluid filter 200 may employ a similar construction as fluid filter 10, but for the drain valve 220 connection to the fluid filter 200 and the descriptions detailed herein.

As shown, the filter cartridge includes a filter element 204 having a filter media 204a, which may be constructed and function similar to filter media 14a above. The filter element 204 includes an endplate 208. In one embodiment, the drain valve 220 is engaged with the endplate 208. The endplate 208 includes a protruding boss structure 208a extending away from the endplate 208. The boss structure 208a forms a pocket-like configuration that is receivable for a head portion of the drain valve 220.

FIG. 3 shows the drain valve 220 is releasably attached to the endplate 208 of the filter element 204. In one embodiment, the protruding boss structure 208a includes threads 207 disposed on its inner surface. The drain valve 220 can be inserted through an opening 202a of the housing 202 and into the pocket-like structure created by the protruding boss structure 208a. The drain valve 220 includes threads 222 disposed on its outer surface. The threads 222 of the drain valve 220 can threadedly engage the threads 207 of the protruding boss structure 208a, so that the drain valve 220 is connected to the filter element 204. By this engagement, the drain valve 220 can be tightened onto the filter element 204. Likewise, the drain valve 220 can be loosened and disconnected from the filter element 204 and removed from the housing 202 by releasing the threaded engagement. It will be appreciated that the engagement between the filter element 204 and the drain valve 220 is not limited to the specific structure shown, and that other releasable connections not including a threaded engagement may be employed as suitable and/or necessary.

FIG. 3 shows a seal 230 provided between an inner annular surface of the opening 202a of the housing 202 and the drain valve 220. In one embodiment, the seal 230 is disposed on the outer annular surface of the drain valve 220. The seal 230 provides a fluid tight seal that prevents unfiltered fluid from entering and exiting the drain valve 220, when the drain valve 220 is in a closed position. The seal 230 can be released as will be described below.

In one embodiment, the housing 202 includes a protruding boss structure 202b. The protruding boss structure 202b extends toward the filter element 204 inside the housing 202. The protruding boss structure 202b is configured as a pocket-like structure, and is at least partially receivable of the protruding boss structure 208a. As one example, the protruding boss structure 208a of the filter element 204 locates in the pocket-like configuration of the boss structure 202b of the housing 202.

As shown, the location of the drain valve 220 with respect to the boss structures 202b, 208a is off center from a center axis (not shown) of the entire fluid filter 200. That is, the drain valve 220 is positioned at one end of the fluid filter 200 and toward one side or area, rather than at a center location. The boss structures 202b, 208a of the filter housing 202 and filter element 204 and their placement also act as a key feature to orient the filter element 204 within the housing 202. In such a configuration, the key feature helps ensure that a filter element is properly loaded in the housing. Further, the key feature helps ensure that the proper filter element is loaded, as the loading orientation requires a particular construction of filter element for the fluid filter 200.

As shown in FIG. 3, the housing 202 includes an outer boss structure 202c extending outward from the main wall of the housing 202. The outer boss structure 202c is configured as a pocket-like structure and is opposite of the boss structure 202b inside the housing 202. The outer boss structure 202c is configured to allow for insertion of the drain valve 220 through the opening 202a, through the boss structure 202b, and into the boss structure 208a of the filter element 204. In one embodiment, another seal 232 is disposed on the outer annular surface of the drain valve 220 and distal to the seal 230. The seal 232 engages the drain valve 220 and an inner annular surface of the outer boss structure 202c of the housing 202 in a fluid tight seal, so that substantially no liquid fluid escapes.

In one embodiment, the interface between the outer annular surface of the drain valve and the inner annular surface of the boss structure 202c may also function as an air vent. Such a configuration would allow air to enter the housing 202 when the seal 232 is released, and can help facilitate the release of unfiltered fluid through the opening 226 and drain hole 226a of the drain valve 220, when the seal 230 is released and the drain valve 220 is in the open or "drain" position.

The drain valve 220 can be moved to open and closed positions by an actuator 228. In one embodiment, the actuator 228 is a knob-like structure connected to the drain valve 220, and can be rotated to move the drain valve 220 to both open and closed positions. In one example, the actuator 228 includes a grip surface 228a that facilitates rotation by a user so he/she can easily grab a hold of the actuator and turn it.

By rotating the actuator 228 in one direction, the threaded engagement between the drain valve 220 and the filter element 204 can be loosened. In one embodiment, the seal 230 between the outer surface of the drain valve 220 and the inner surface of the housing opening 202a is released. By at least partially releasing or loosening the threaded engagement between the drain valve 220 and the filter element 204, the drain valve 220 moves downward or away from the endplate 208 of the filter element 204. Likewise, the seal 230 disengages from the opening 202a of the housing 202. When the seal 230 has been released, unfiltered fluid can flow through a window 209 of the boss structure 202b inside the housing 202, which provides a path to access the opening 226 of the drain valve 220. As the actuator is rotated to release the seal 230, a path around a chamfer 202d proximate the housing opening 202a allows unfiltered fluid to move through the window 209, to the flow opening 226 of the drain valve 220, and through the stem and hose portion 227 of the drain valve 220.

As with fluid filter 100, unfiltered fluid may also be allowed to move around and between the boss structures 202b, 208a and into the opening 226 of the drain valve 220 and continue to move through the stem and hose portions 227. The unfiltered fluid may then flow and exit the drain hole 226a.

As with drain valve 120, FIG. 3 shows the drain valve 220 with a barbed end 227a at the end of the hose 227. The barbed end 227a can allow for attachment to various fluid lines if desired and/or necessary.

As another example, the threaded engagement between the drain valve 220 and the filter element 204 may be completely removed, so that the drain valve 220 can be completely removed from engagement with the housing 202. Likewise, by rotating the drain valve 220 in an opposite direction, the threaded engagement between the drain valve 220 and the filter element 204 can be restored, while the sealing engagement between the drain valve 220 and the housing 202 may be restored.

FIG. 3 shows that the drain valve 220 must be in an open or "drain" position for the fluid filter 200 to be serviced. By the connective configuration between the fluid filter 200 and the drain valve 220, the drain valve 220 can be loosened from a threaded engagement with the filter element 204. The seal 230 between the drain valve 220 and the housing 202 is then released. In this manner, unfiltered fluid is allowed to drain. Further loosening of the engagement between the drain valve 220 and the filter element 204 allows removal of the drain valve 220, where the filter cartridge may be serviced and/or replaced. That is, unfiltered fluid must be allowed to drain through the drain valve 220, prior to servicing of the fluid filter 200. Further, the drain valve 220 must be removed from its engagement with the filter element 204, before the filter element 204 can be removed and serviced.

FIG. 3 shows the fluid filter 200 in the closed position, such that no unfiltered fluid is allowed through the drain hole 226a of the drain valve 220. It will be appreciated that the drain valve 220 may be moved to the open position and back to its closed position when desired and as described. It further will be appreciated that "unfiltered fluids" is meant as fluid on the unclean or "dirty" side of the filter element 204, and can include but is not limited to water, an unfiltered working fluid, other contaminants, or the like.

In yet another embodiment, the actuator 228 may also act to physically prevent the fluid filter 200 from being replaced. In many fluid filters, a filter removal feature 210 is disposed on an outer surface of the housing 202. Typically, the filter removal feature 210 is constructed as an access to remove the filter. Oftentimes, a square socket wrench may be used, so that the housing 202 can be removed. As shown in FIG. 3, the actuator 228 of the drain valve 220 is positioned to physically block access to the filter removal feature 210. In this configuration, the housing 202 must be drained, and the drain valve 220 be removed from the housing 202 before the entire fluid filter 200 can be removed and changed.

Figure 4:
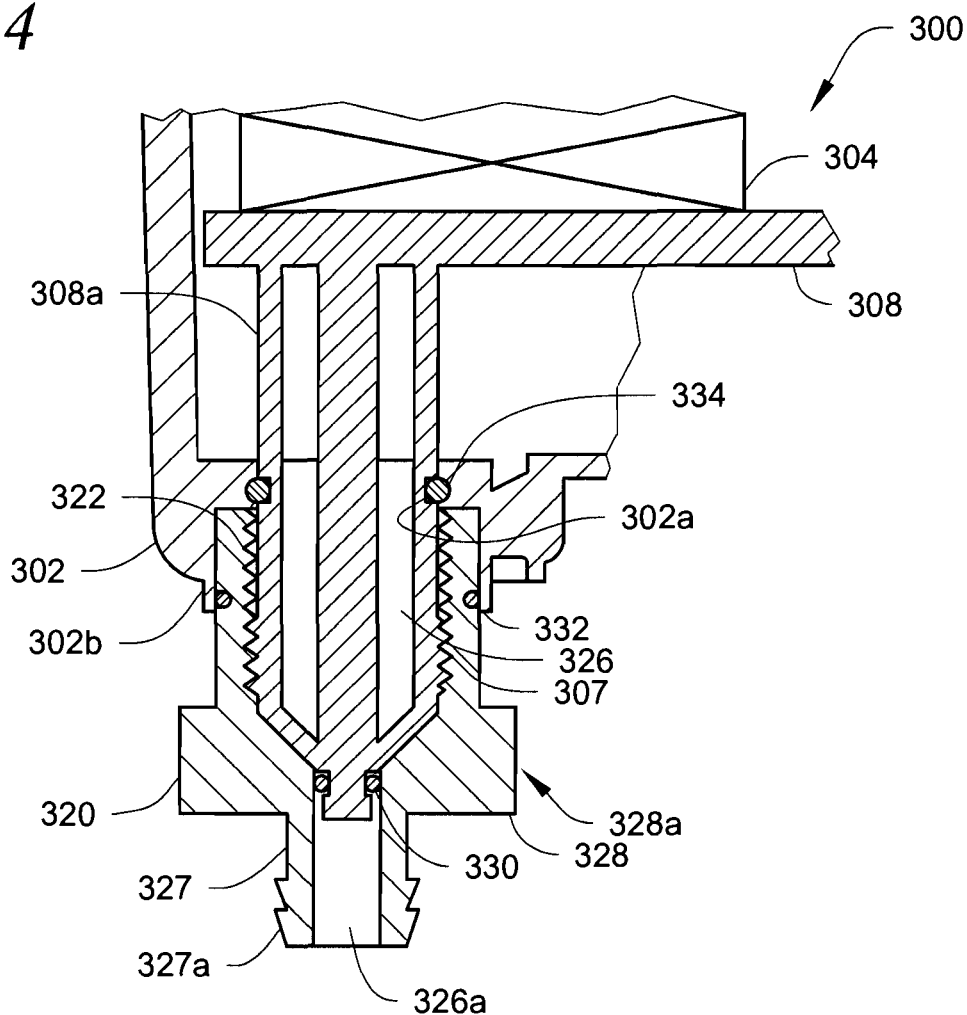
FIG. 4 illustrates a partial side sectional view of a fluid filter having a drain valve connected thereto.
Figure 5:
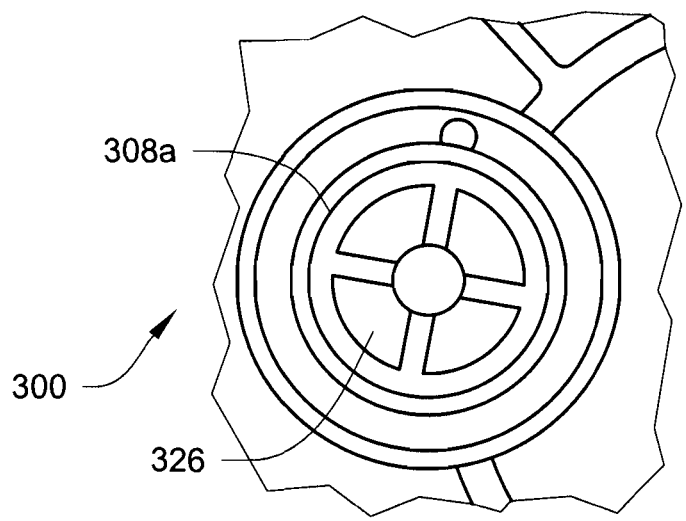
FIG. 5 illustrates a partial end view of the fluid filter of FIG. 4.

FIG. 4-5 illustrates yet another embodiment of a fluid filter 300 having a drain valve 320 connected thereto. As with fluid filter 200, the drain valve 320 is sealed to a housing 302 and releasably attached with a filter element 304. The fluid filter 300 is shown as a partial side sectional and is not fully illustrated. It will be appreciated that the fluid filter 300 may have some construction similar as fluid filter 10, but for the drain valve 320 connection to the fluid filter 300 and the descriptions detailed herein.

FIG. 4 shows the filter element 304 includes an endplate 308. In one embodiment, the drain valve 320 is engaged with the endplate 308 through a protrusion 308a extending away from the endplate 308. The protrusion 308a extends through an opening 302a of the housing 302 and is receivable by the drain valve 320.

FIG. 4 shows the drain valve 320 is releasably attached to the endplate 308 of the filter element 304 through the protrusion 308a. In one embodiment, the protrusion 308a includes threads 307 disposed on its inner surface. The drain valve 320 includes threads 322 disposed on its inner surface. The drain valve 320 can be inserted into the opening 302a of the housing 302. The threads 322 of the drain valve 320 can threadedly engage the threads 307 of the protrusion 308a, so that the drain valve 320 is connected to the filter element 308. By this engagement, the drain valve 320 can be tightened onto the filter element 308. Likewise, the drain valve 320 can be loosened and disconnected from the filter element 308 and removed from the housing 302 by releasing the threaded engagement. It will be appreciated that the engagement between the filter element 308 and the drain valve 320 is not limited to the specific structure shown, and that other releasable connections not including a threaded engagement may be employed as suitable and/or necessary.

FIG. 4 shows a seal 330 provided between an inner annular surface of the drain valve 320 and an outer annular surface of the protrusion 308a. In one embodiment, the seal 330 is disposed on the outer annular surface of the protrusion 308a and distally positioned with respect to the endplate 308. The seal 330 provides a fluid tight seal that prevents unfiltered fluid from exiting the drain valve 320, when the drain valve 320 is in a closed position. The seal 330 can be released as will be described below.

In one embodiment, the housing 302 includes an outer boss structure 302b. The outer boss structure 302b extends outward from the housing 302. The outer boss structure 302b is configured as a pocket-like structure, and is at least partially receivable of the drain valve 320. As one example, the outer boss structure 308a helps locate the protrusion 308a with the drain valve 320.

As shown, the location of the drain valve 320 with respect to the outer boss structure 302b and protrusion 308a is off center from a center axis of the entire fluid filter 300. See bottom view in FIG. 5 for example. That is, the drain valve 320 is positioned at one end of the fluid filter 300 and toward one side or area, rather than at a center location. The outer boss structure 302b, the protrusion 308a, and their placement also act as a key feature to orient the filter element 304 within the housing 302. In such a configuration, the key feature helps ensure that a filter element is properly loaded in the housing. Further, the key feature helps ensure that the proper filter element is loaded, as the loading orientation requires a particular construction of filter element for the fluid filter 300.

FIG. 4 shows a seal 332 is disposed on the outer annular surface of the drain valve 320. The seal 332 engages the drain valve 320 and an inner annular surface of the outer boss structure 302b of the housing 302 in a fluid tight seal, so that substantially no liquid fluid escapes. In one embodiment, the interface between the outer annular surface of the drain valve 320 and the inner annular surface of the boss structure 302b may also function as an air vent. Such a configuration would allow air to enter the housing 302 when the seal 332 is released, and can help facilitate the release of unfiltered fluid through openings 326 and drain hole 326a of the drain valve 320, when the seal 330 is released and the drain valve 320 in the open or "drain" position.

A further seal 334 may be provided between an inner annular surface of the opening 302a of the housing and an outer annular surface of the protrusion 308a. In one embodiment, the seal 334 is disposed within a groove of the protrusion 308a. The seal 334 is configured to provide a fluid tight seal between the housing 302 and the protrusion 308a to substantially prevent leakage of fluid.

The drain valve 320 can be moved to open and closed positions by an actuator 328. In one embodiment, the actuator 328 is a knob or cap-like structure connected to the drain valve 320, and can be rotated to move the drain valve 320 to both open and closed positions. As with other actuators described, the actuator 328 includes a grip surface 328a that facilitates rotation by a user so he/she can easily grab a hold of the actuator and turn it.

By rotating the actuator 328 in one direction, the threaded engagement between the drain valve 320 and the protrusion 308a of the filter element 304 can be loosened. In one embodiment, the seal 330 between the inner surface of the drain valve 320 and the outer surface of the protrusion 308a is released. Further, the seal 332 between the outer surface of the drain valve 320 and the inner surface of the outer boss structure 302b is released. By at least partially releasing or loosening the threaded engagement between the drain valve 320 and the protrusion 308a, the drain valve 320 can move downward or away from the endplate 308 of the filter element 304. Likewise, when the seal 330 has been released, unfiltered fluid can flow through openings 326 (See also FIG. 5) of the protrusion 308a, which provide a path to exit the drain valve 320 through the stem 327 and drain hole 326a.

As with drain valve 120, FIG. 4 shows the drain valve 320 with a barbed end 327a at the end of the hose 327. The barbed end 327a can allow for attachment to various fluid lines if desired and/or necessary.

As another example, the threaded engagement between the drain valve 320 and the protrusion 308a of the filter element 304 may be completely disengaged, so that the drain valve 320 can be completely removed from the housing 302. Likewise, by rotating the drain valve 320 in an opposite direction, the threaded engagement between the drain valve 320 and the protrusion 308a can be restored, while also restoring the sealing engagement between the drain valve 320 and the protrusion, as well as between the drain valve 320 and the outer boss structure of the housing 302.

FIG. 4 shows that the drain valve 320 must be in an open or "drain" position for the fluid filter 300 to be serviced. By the connective configuration between the fluid filter 300 and the drain valve 320, the drain valve 320 can be loosened from a threaded engagement with the filter element 304. The seal 330 between the drain valve 320 and the protrusion 308a of the endplate 308 is then released. In this manner, unfiltered fluid is allowed to drain. Further loosening of the engagement between the drain valve 320 and the filter element 304 allows removal of the drain valve 320, where the fluid filter 300 including the filter element 304 may be serviced and/or replaced. That is, unfiltered fluid must be allowed to drain through the drain valve 320, prior to servicing the fluid filter 300. Further, the drain valve 320 must be removed from its engagement with the filter element 304, before the filter element 304 can be removed and serviced.

FIG. 4 shows the fluid filter 300 in the closed position, such that no unfiltered fluid is allowed through the drain hole 326a of the drain valve 320. It will be appreciated that the drain valve 320 may be moved to the open position and back to its closed position when desired and as described. It further will be appreciated that "unfiltered fluids" is meant as fluid on the unclean or "dirty" side of the filter element 304, and can include but is not limited to water, an unfiltered working fluid, other contaminants, or the like.

Figure 6:
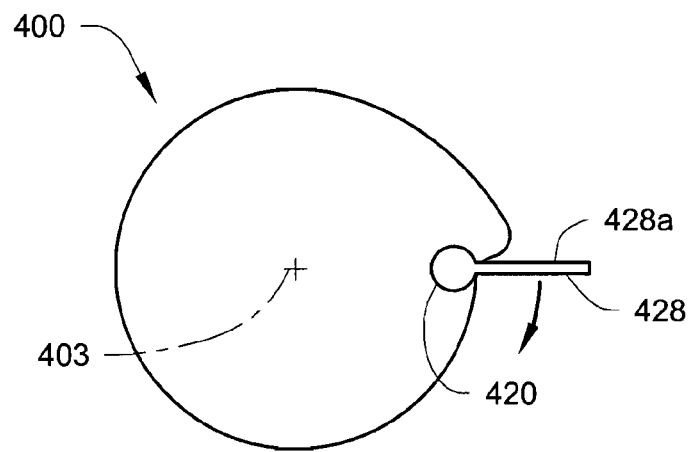
FIGS. 6-8 illustrate yet another embodiment of a fluid filter having a drain valve connected thereto.
Figure 7:
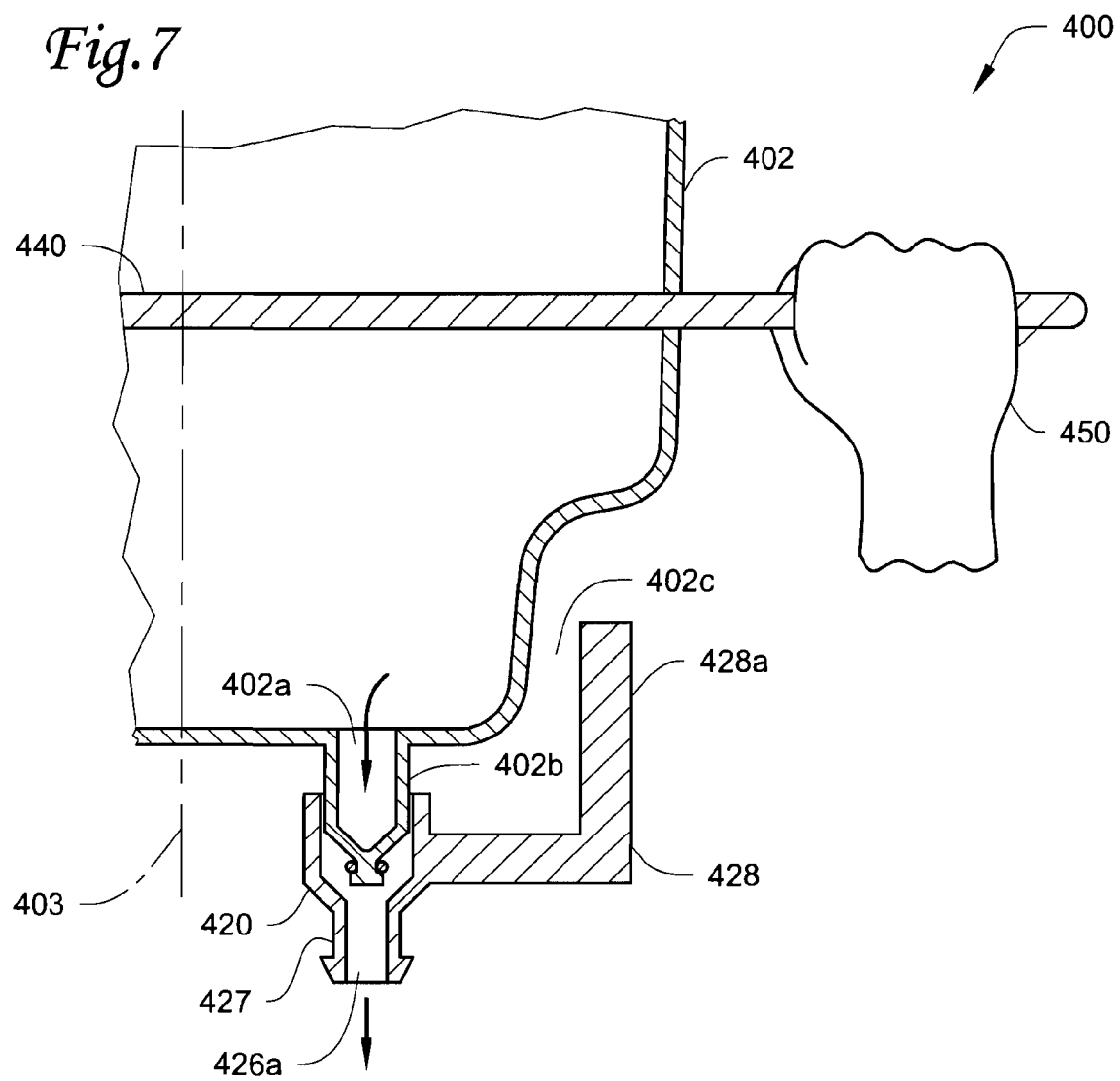
Figure 8:
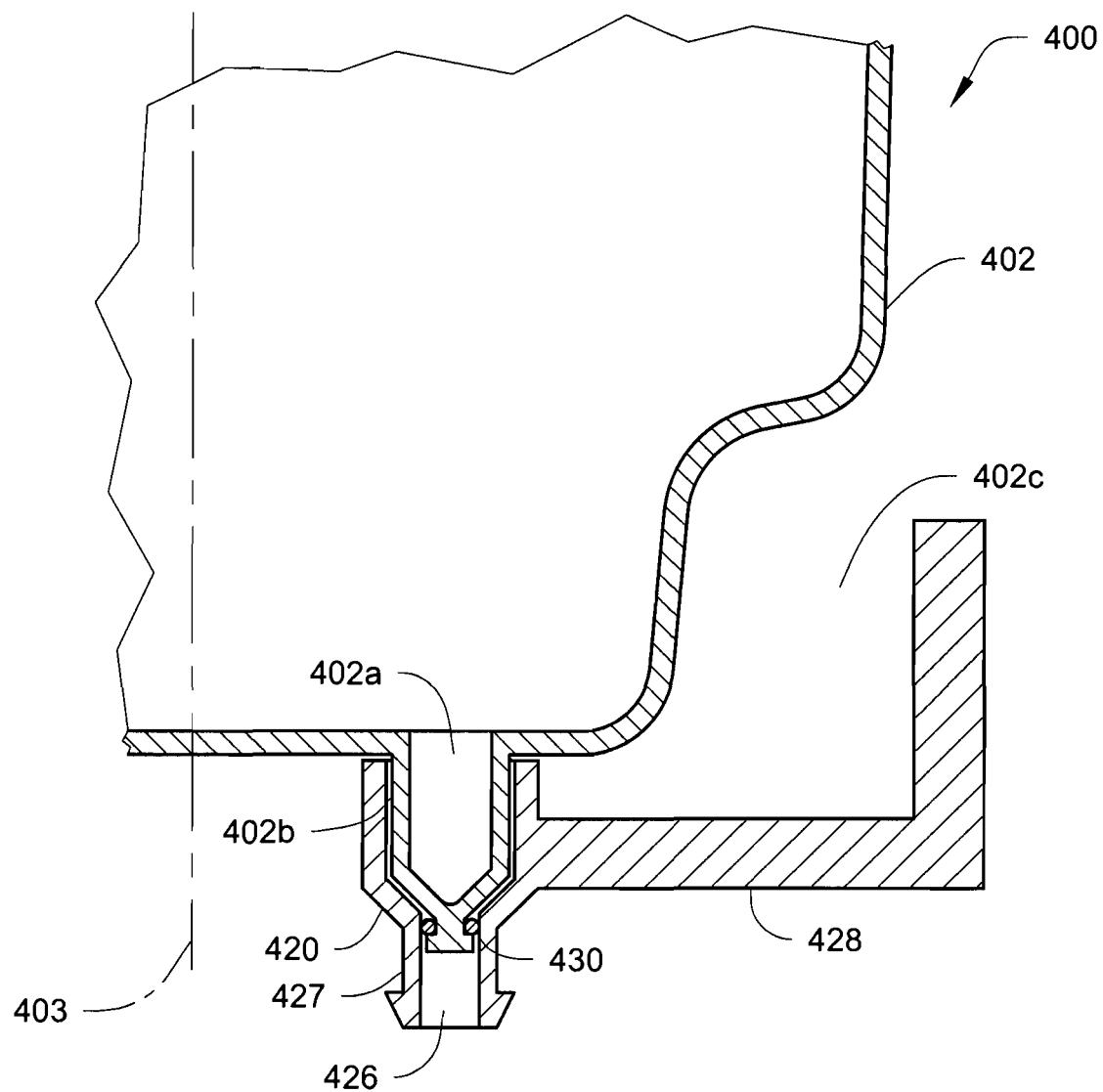

FIGS. 6-8 illustrate yet another embodiment of a fluid filter 400 having a drain valve 420 connected to a housing 402. FIGS. 6-8 show the fluid filter 400 which further incorporates a lever 428a feature on an actuator 428. Further details of the filter cartridge and element are not shown for ease of description of the modified housing 402. It will be appreciated, however, that any suitable filter cartridge such as known in the art may be employed for the fluid filter 400, since the housing 402 and lever 428a provide the focus of modification in fluid filter 400.

FIG. 6 shows an end or bottom view of fluid filter 400. A center axis 403 of the fluid filter 400 shows the off center orientation and geometry of the drain valve 420. The drain valve 420 is shown in the closed position. As shown in FIGS. 7 and 8, the drain valve 420 can releasably connect and seal with a protrusion 402b of the housing 402. The protrusion 402b may be similarly constructed as protrusion 308a, but for the protrusion being a part of the housing rather than an endplate of a filter cartridge.

The actuator 428 is configured as a lever 428a connected to the drain valve 420. As shown in FIGS. 6 and 7, by rotating the lever 428a to move the drain valve 420 to the open position (see arrow by actuator 428), fluid flow is allowed through an opening 402a of the housing 402 and through a hose 427 and drain hole 426 of the drain valve 420. As best shown in FIG. 7, a user or service person 450 may then use his/her hand to operate a wrench 440 and slip past and move up the housing 402 to remove the filter.

FIG. 7 shows the drain valve 420 in the open position. In one embodiment, a quarter turn rotation of the lever 428a, allows the drain valve 420 to be opened so that a seal 430 (see FIG. 8) is released between an outer annular surface of the protrusion 402b and the inner annular surface of the drain valve 420. As one example, the seal 430 is disposed in a groove of the protrusion 402b. By rotating the lever 428, the drain valve 420 is moved downward and away from the protrusion 402b to disengage the drain valve 420 from the seal 430. Turning the actuator 428 of the drain valve 420 also rotates the lever 428a out of the way (e.g. into a pocket area 402c outside the housing 402) to allow a wrench 440 to remove the housing 402. In one example, the wrench may be strap wrench as known in the art for removing fluid filters. With the drain valve open, fluid flow of unfiltered fluid is allowed to exit the filter, and a strap wrench can move up the housing. In such a configuration, a cleaner servicing can be provided.

FIG. 8 shows the fluid filter 400 in the closed position. In one embodiment, the lever 428a extends generally outwardly from and transverse to the longitudinal axis 403 of the housing 402. The lever 428a extends upwardly and generally in parallel with the outer surface and longitudinal axis of the shell/housing. In the closed position, the lever extends a distance further than the outer dimension of the filter, so that servicing and removal of the filter including the housing is prevented. That is a wrench would not have the necessary clearance to move past the drain valve 420 and lever 428a of the actuator 428.

In the open position, the lever 428a is moved or rotated to a position such that the lever does not extend beyond the outer dimension of the housing 402. For example in FIG. 7, the lever 428a does not extend beyond the outer perimeter of the housing 402. In this configuration, a wrench may be used to remove the fluid filter 400 as it would have the clearance necessary to move past the lever 428a and drain valve 420 to secure around the housing 402.

Figure 9:
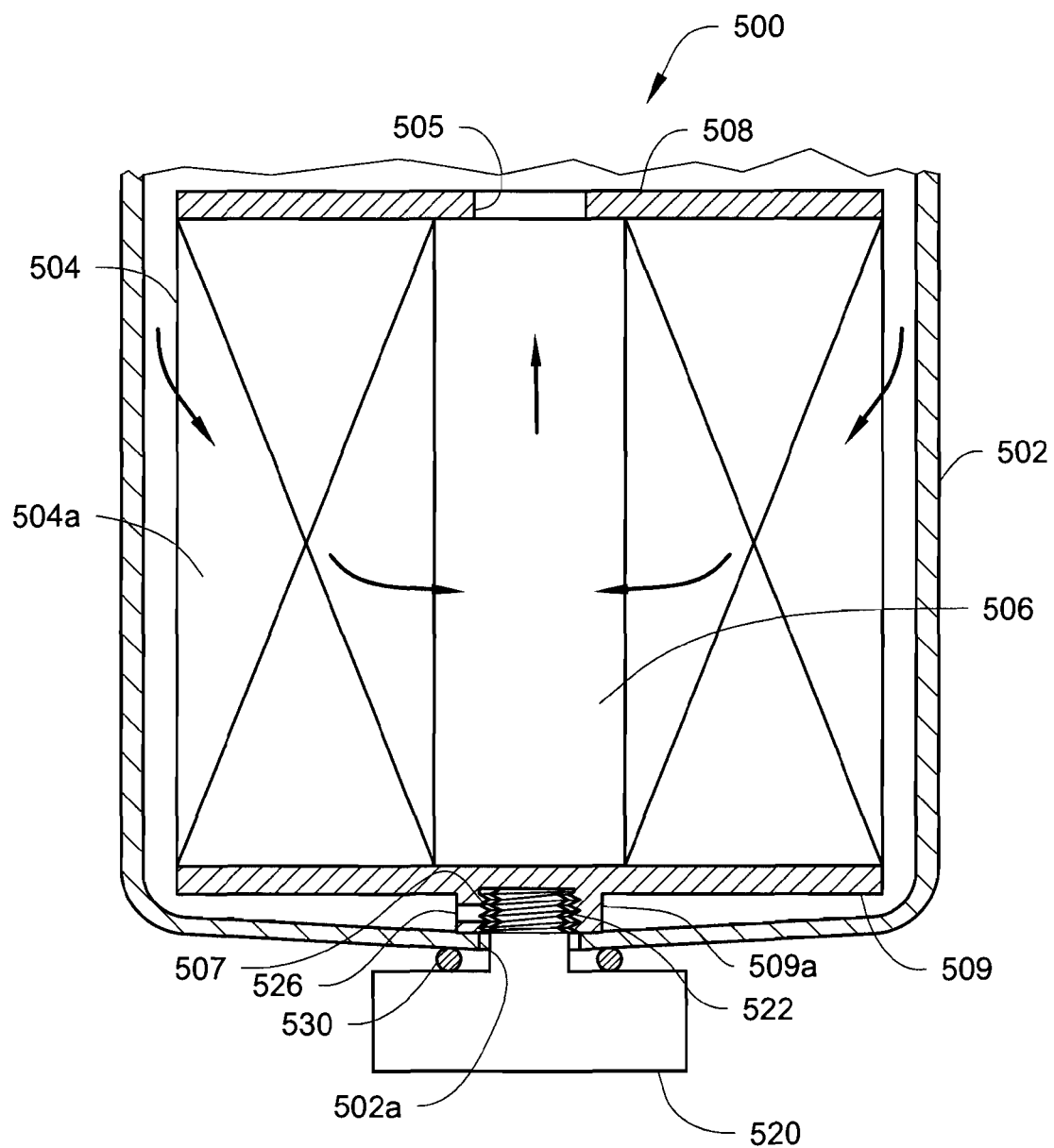
FIG. 9 illustrates a partial sectional view of another embodiment of a fluid filter having a drain valve connected thereto.

FIG. 9 illustrates yet another embodiment for a fluid filter 500. The fluid filter 500 is configured such that a drain valve 520 is directly connected to an endplate 509 of a filter cartridge and is sealed with a housing 502. The fluid filter 500 is shown in the closed position, where a seal 530 is disposed between a surface of the drain valve 520 and an outer surface of the housing 502. In some embodiments, the seal 530 may be bonded to either the housing 502 or the drain valve 520. The seal can be, but is not limited to an o-ring or a gasket seal.

The filter cartridge includes a filter element 504 having a filter media 504a with two endplates 508, 509. The two endplates 508, 509 are connected to the filter element 504 at opposing ends of the filter element 504. The filter media 504a, for example, may be a concentrically shaped media where fluid to be filtered enters and flows through the filter media 504a, into a center area 506 and out an opening 505 of endplate 508 (see flow arrows). It will be appreciated that the opening 505 would be in fluid communication with an opening or outlet (not shown) of the housing 502 as known in the art. It further will be appreciated that the fluid to be filtered may enter the housing through another opening or inlet (not shown) as known in the art. As one example only, a filter head such as previously described (i.e. FIG. 1 with filter head 11 and openings 13, 15) can be connected at one end of the housing 502 and can include suitable inlet and outlet openings to separate incoming fluid to be filtered from fluid that has been filtered by the filter media 504a.

Turning to the drain valve 520 and filter cartridge connection, the drain valve 520 is connected to the endplate 509. The endplate 509 includes a boss structure 509a extending away from the endplate 509 and filter media 504a. The boss structure 509a includes an inner thread 507. The drain valve 520 includes a post 522 with an outer thread that is receivable inside the boss structure 509a. As shown, the post 522 extends through a drain opening 502a of the housing 502, so that the post 522 may threadedly connect with the thread of the boss structure 509a. For example, the drain valve 520 may be rotated to engage the thread of the drain valve 520 with the thread of the boss structure 509a. While the connection between the drain valve 520 and the endplate 509 is a threaded connection, it will be appreciated that the fluid filter 500 is not limited to the specific configuration shown and that various connective structures may be employed to connect the drain valve to the endplate. For example, such other configurations may include snap fit, interference fit, and other mechanical connections suitable for achieving a releasable connection between the drain valve and the endplate of the filter cartridge.

In the closed position, the seal 530 provides the fluid tight seal, so that no fluid exits the housing 502 through the opening 526 of the boss structure 509a. In the closed position, the drain valve 520 is tightened to the boss structure 509a of the endplate 509. The closed or sealed position provides an axial seal where the housing 502 is pinched between the boss structure 509a of the endplate and the seal 530. To open the drain valve 520, the connection between the boss structure 509a and the drain valve 520 can be loosened by rotating the drain valve to thereby release the seal 530 from engagement between the drain valve 520 and the housing 502.

When in the open position, unfiltered fluid may flow out of the housing 502 through opening 526 of the boss structure 509a and the drain opening 502a of the housing 502. In the closed position, the seal 530 is engaged, such that no fluid may exit the housing 502. In the embodiment shown, the drain opening 502a of the housing 502 may be single hole drilled through the housing 502 that does not require a nut or complex shape.

As shown, a modified endplate design provides a specific filter cartridge for the fluid filter 500, such that the fluid filter 500 cannot be used unless the correct filter cartridge is installed. The fluid filter provides for a specific filter cartridge that may be centered using the drain valve, where release of the drain valve from the filter cartridge must occur before servicing the filter cartridge. In such a configuration, the fluid filter must be opened for draining prior to servicing of the filter.

Figure 10:
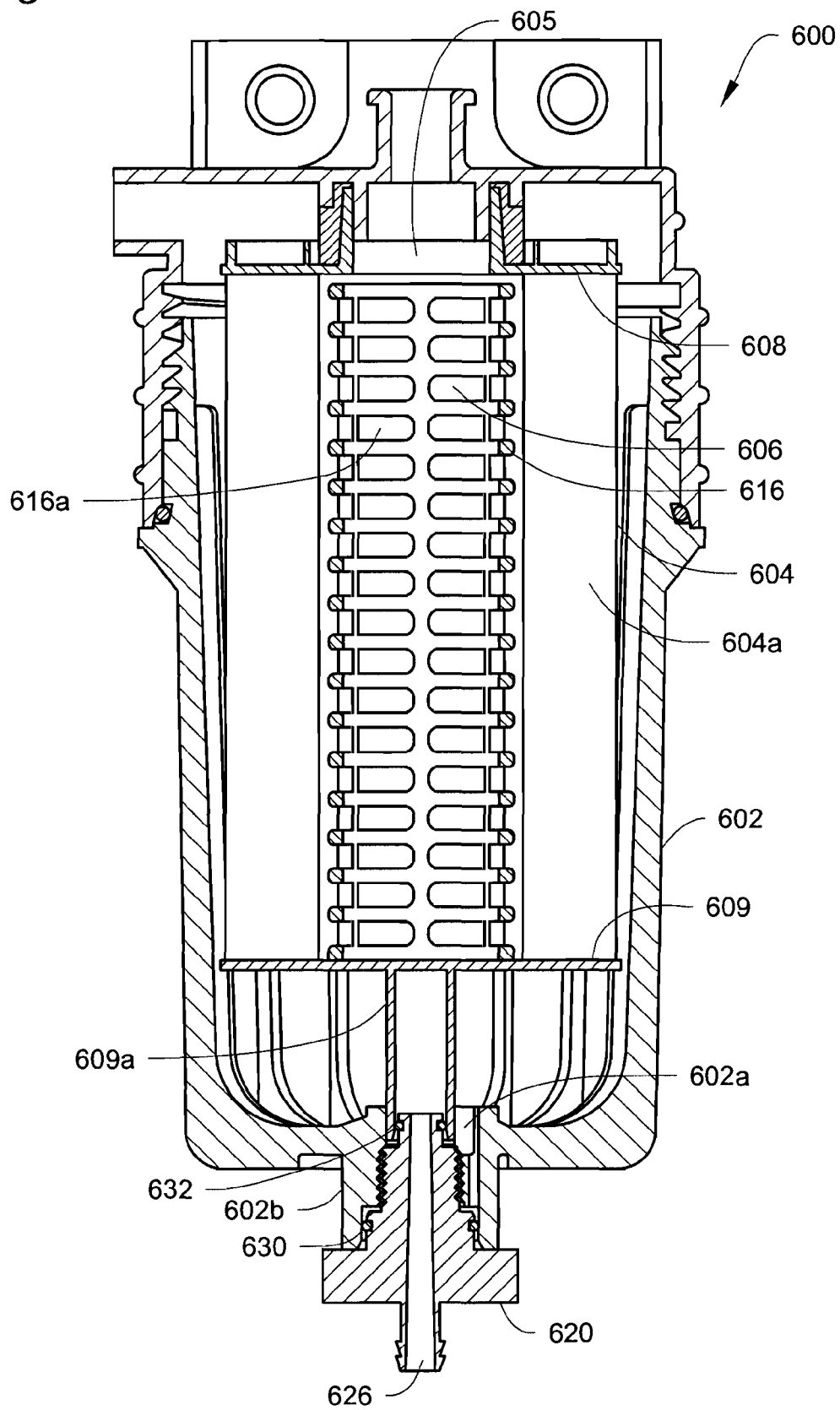
FIGS. 10-13 illustrate partial sectional views of another embodiment of a fluid filter having a drain valve connected thereto.
Figure 11:
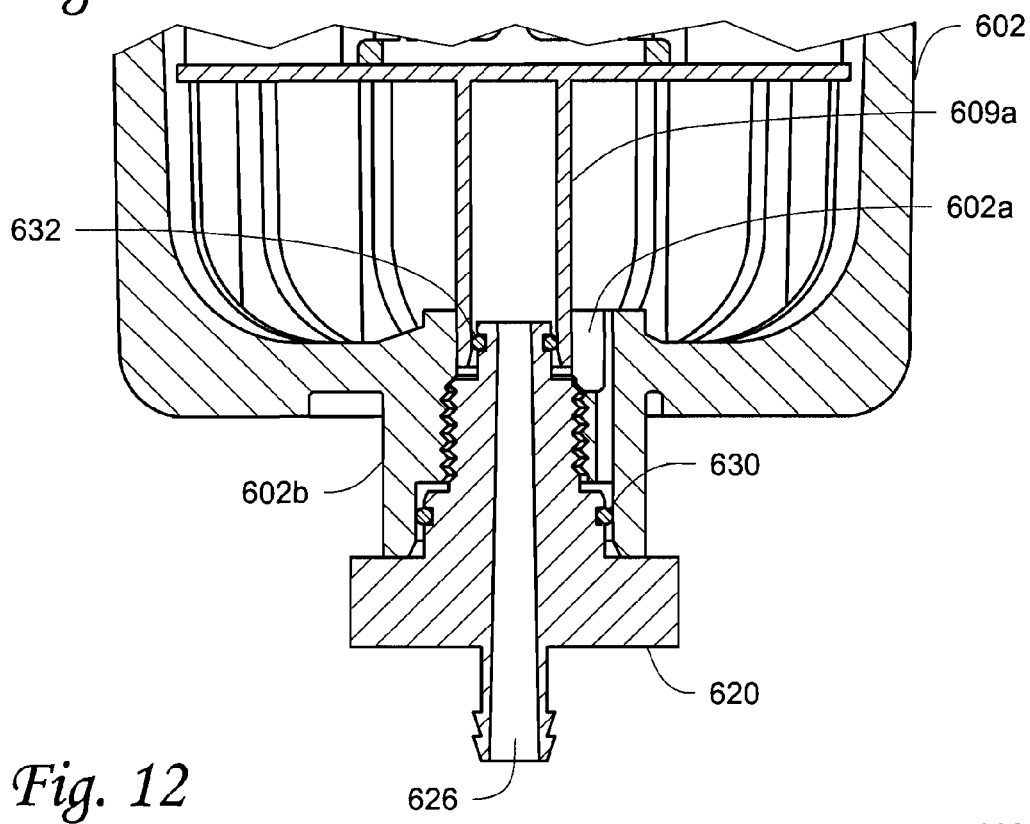

FIGS. 10-13 show another embodiment of a fluid filter 600. The fluid filter 600 is configured such that a drain valve 620 is directly connected to a housing 602 and is sealed with an endplate 609 of a filter cartridge. FIGS. 10-11 show the fluid filter 600 in the closed position. A seal 630 is disposed between an outer surface of the drain valve 620 and an inner surface of a boss structure of the housing 602. A seal 632 also is disposed between an outer surface of the drain valve 620 and an inner surface of a boss structure of the endplate 609 of the filter cartridge. The seals 630, 632, can be disposed within grooves of the drain valve 620. As shown, the seals can be but are not limited to an o-ring or a gasket seal.

The filter cartridge includes a filter element 604 having a filter media 604a. Two endplates 608, 609 are connected to the filter element 604 at opposing ends of the filter element 604. The filter media 604a, for example may be a concentrically shaped media, where fluid to be filtered enters the housing 602 and flows through the filter media 604a, into a center area 606. A center tube 616 is disposed within the center area and includes openings 616a that are in fluid communication with the filter media 604a. The center tube 616 allows filtered fluid flow through the openings 616a and exit through opening 605 of the endplate 608. It will be appreciated that the opening 605 would be in fluid communication with another opening to allow filtered fluid to exit the fluid filter 600. It further will be appreciated that the fluid to be filtered may enter the housing through an opening as may be known in the art. As shown in one example, the housing can be connected to a filter head with suitable openings to separate incoming fluid to be filtered from fluid that has been filtered by the filter media 604a.

Turning to the drain valve 620 and filter cartridge connection, the drain valve 620 is connected to the housing 602. The housing 602 includes a drain opening 602a formed by a boss structure 602b with an inner thread. The drain valve 620 is receivable inside the boss structure 602b of the housing 602. The drain valve 620 includes an outer thread that can be threadedly engaged with the thread on the boss structure 602b. As shown, drain valve 602 extends through the drain opening 602a, so that the drain valve 620 may threadedly connect with the thread of the boss structure 602b and seal with the boss structure 609a of the filter cartridge.

For example, the drain valve 620 may be rotated to engage the thread of the drain valve 620 with the thread of the boss structure 602b. In the closed position, the seal 630 provides a fluid tight seal between the drain valve 620 and the boss structure 602b of the housing. Seal 632 provides a fluid tight seal between the drain valve 620 and the boss structure 609a of the endplate 609, as the drain valve 620 is tightened to the boss structure 602b of the housing 602.

To open the drain valve 620, the connection between the boss structure 602b and the drain valve 620 can be loosened to release the seals 630, 632 from their respective sealing engagement. Alternatively, the filter cartridge may be pulled out from the drain valve 620, such that the seal between the boss structure 609a and the drain valve 620 is released. The open configuration allows fluid to flow through the opening 602a to a flow opening 626 of the drain valve. The flow opening 626 is in fluid communication with the drain opening 602a such that, when the drain is in the open configuration, fluid may flow through the drain valve 620 and out of the housing 602.

While the connection between the drain valve 620 and the boss structure 602b of the housing 602 is a threaded connection, it will be appreciated that the fluid filter 600 is not limited to the specific configuration shown and that various connective structures may be employed to connect the drain valve to the endplate. For example, such other configurations may include snap fit, interference fit, and other mechanical connections suitable for achieving a releasable connection between the drain valve and the endplate of the filter cartridge.

An air vent 612 is in fluid communication with the drain opening 602a. The air vent 612 allows air to enter the housing 602, for example when the seal 630 is released, and can help facilitate release of unfiltered fluid through the opening 620a and the drain hole 626, when the drain valve 620 is in the open or "drain" position.

As shown, a modified endplate and housing design provides a specific filter cartridge for the fluid filter 600, such that the fluid filter 600 cannot be used unless the correct filter cartridge is installed. That is, the correct filter cartridge must be installed in order to properly seal the fluid filter. The fluid filter also provides for a specific filter cartridge that may be centered using the drain valve, where opening of the drain valve from the filter cartridge must occur before servicing the filter cartridge.

Figure 12:
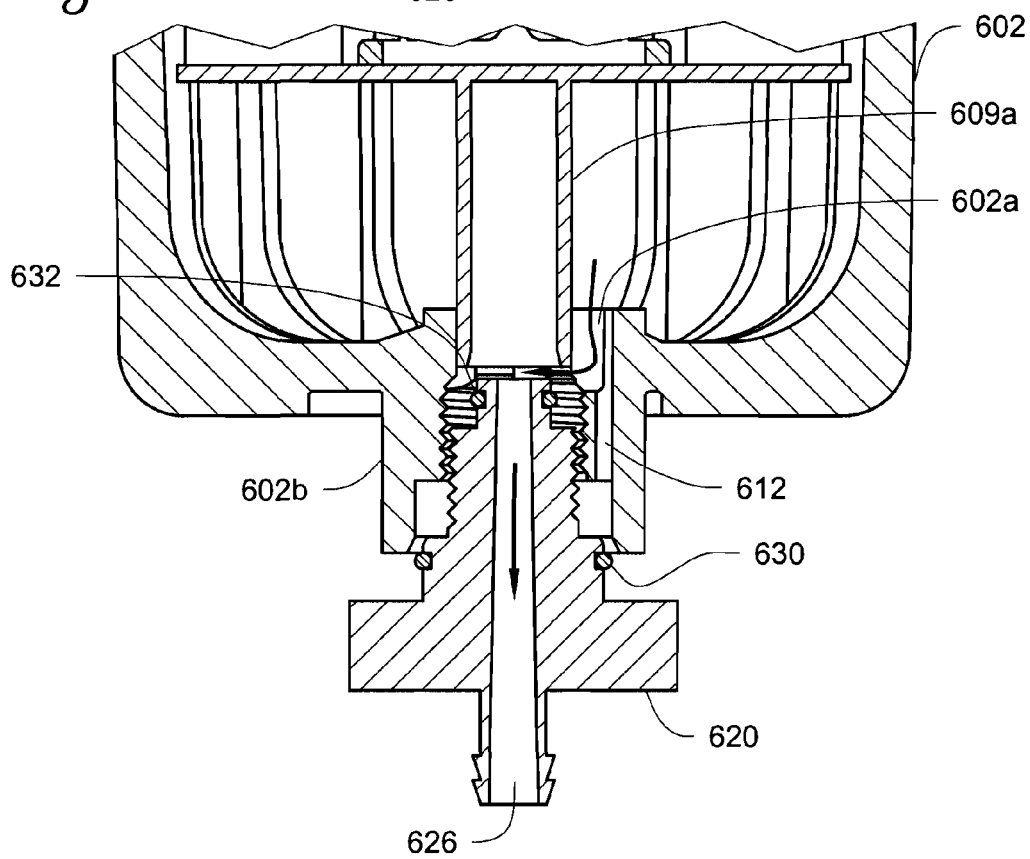
Figure 13:
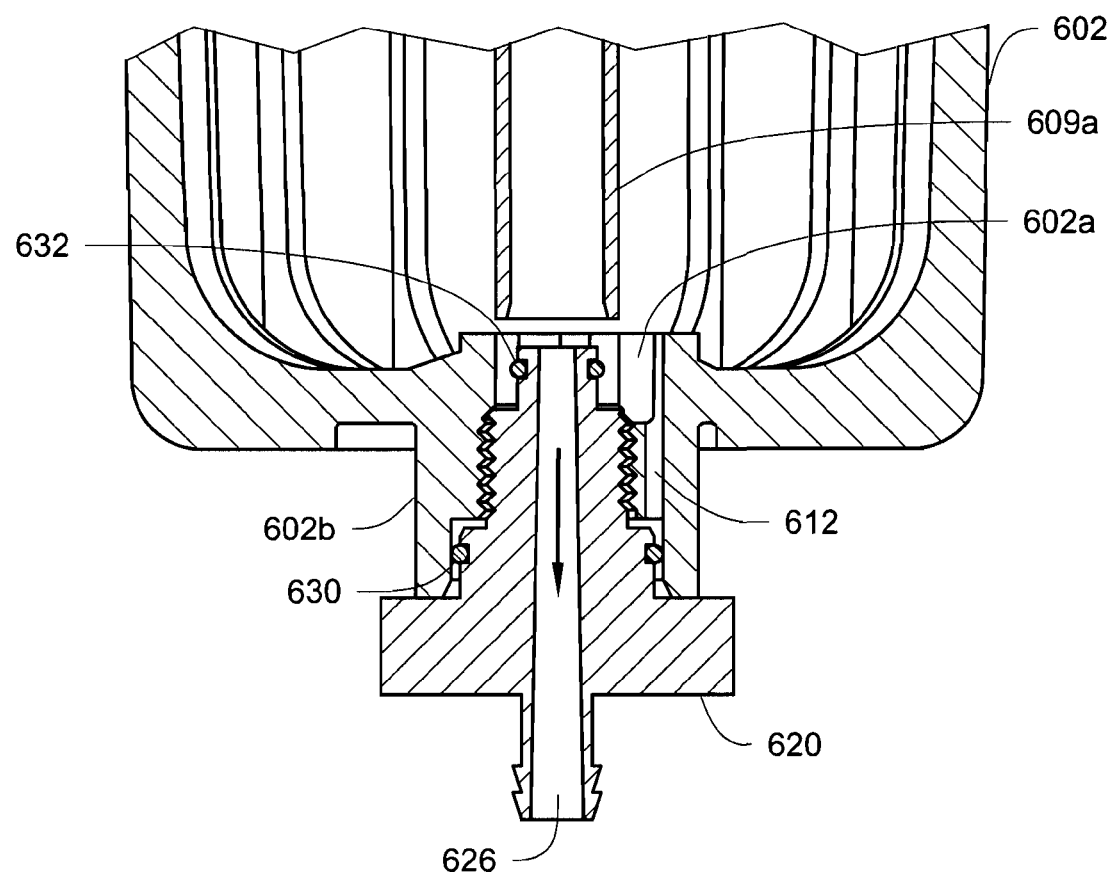
Figure 14:
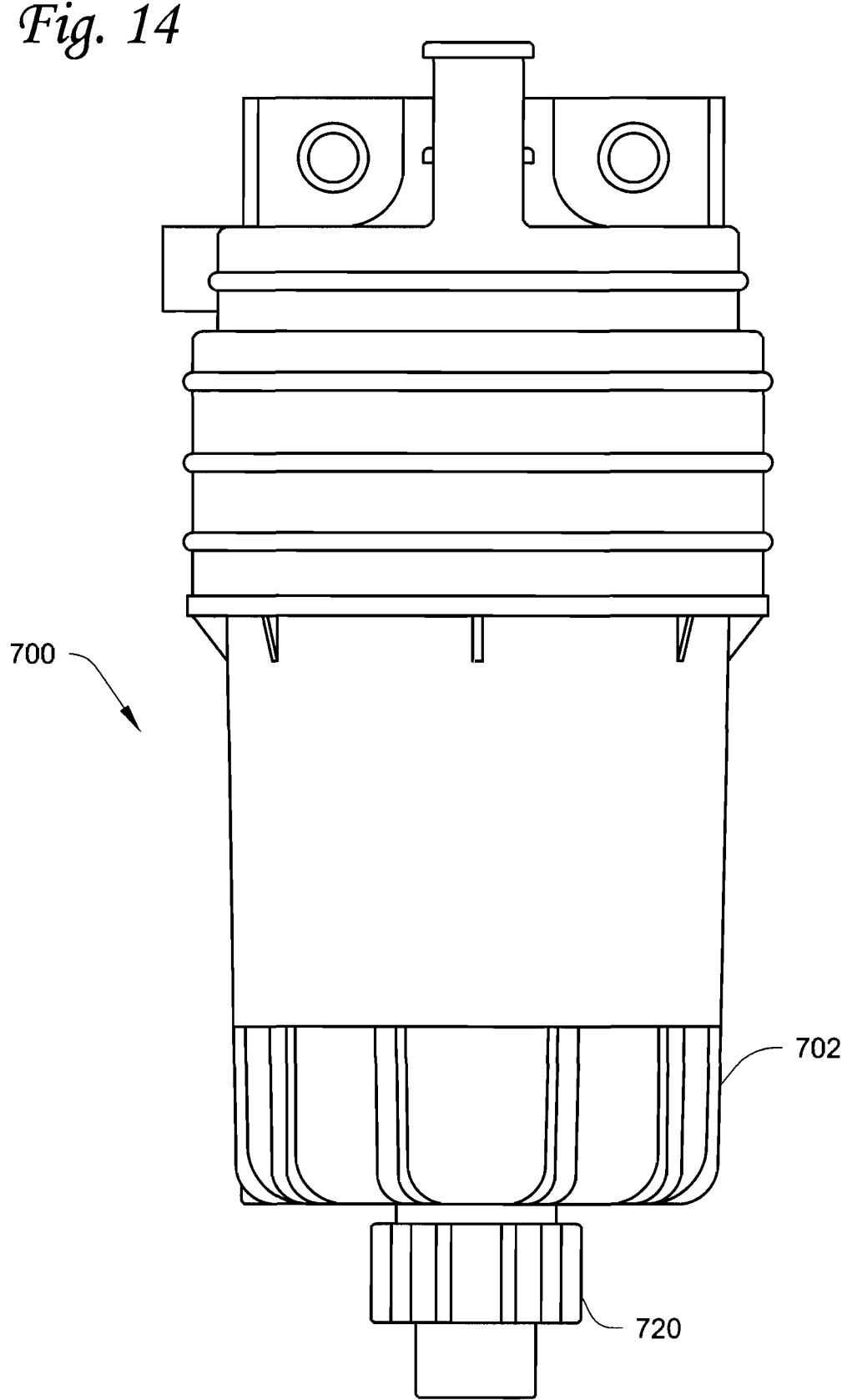
FIGS. 14-18 illustrate another embodiment of a fluid filter having a drain valve connected thereto.

For example, either the drain valve 620 may be rotated to release the seals (i.e. from the bottom of the fluid filter), or the filter cartridge is pulled or moved out of sealing engagement with the drain valve thereby opening the drain (i.e. from the top of the fluid filter). In such a configuration, the fluid filter is opened for draining prior to servicing or replacing the filter cartridge. FIGS. 10-13 show a sealing configuration directly between the drain valve and the filter cartridge with a specific endplate structure. Particularly, FIG. 11 shows the drain valve 620 in the closed configuration. FIG. 12 shows the drain valve 620 in the open configuration. FIG. 13 shows the drain valve in the open configuration when the filter cartridge has been removed from sealing engagement with the drain valve.

FIGS. 14-18 show another embodiment of a fluid filter 700 having a drain valve 720 connected thereto. The fluid filter 700 includes a housing 702 with a filter head 711 connected at one end of the housing 702 that is generally open. The filter head 711 sealingly engages with the housing through a seal 711c. In one example, the seal 711c is a resilient o-ring disposed in a groove about an outer surface of the housing. The seal 711c provides fluid tight seal between the housing 702 and the filter head 711. It will be appreciated that the seal 711c is not limited to the specific structure shown and may be modified as suitable and/or necessary by one of skill in the art.

The drain valve 720 is disposed on the housing 702 at an end opposite the end that the filter head 711 is connected. The drain valve 720 can be opened and closed to allow unfiltered fluid to be released or drained from the fluid filter, and is further described below.

The housing 702 contains a filter cartridge containing a filter element 704. The filter element 704 includes filter media 704a configured to allow a working fluid entering the fluid filter 10 to filter from one side of the filter media 704a to another side of the filter media 704a and allow the working fluid to flow out of the fluid filter 700. The filter head 711 is configured as a cap or lid structure with an opening 711a to allow fluid that is to be filtered to enter the fluid filter 700, and with an opening 711b to allow fluid that has been filtered to exit the fluid filter 700, thereby completing the filter flow path therethrough (See direction of arrows in FIG. 15).

It will be appreciated that "fluid to be filtered" is meant as any working fluid requiring filtration in a process or system, such as but not limited to fuel, oil, coolant, or the like. As one particular example, the fluid to be filtered by the fluid filter 700 is a working fluid used in high pressure common rail fuel systems.

Figure 15:
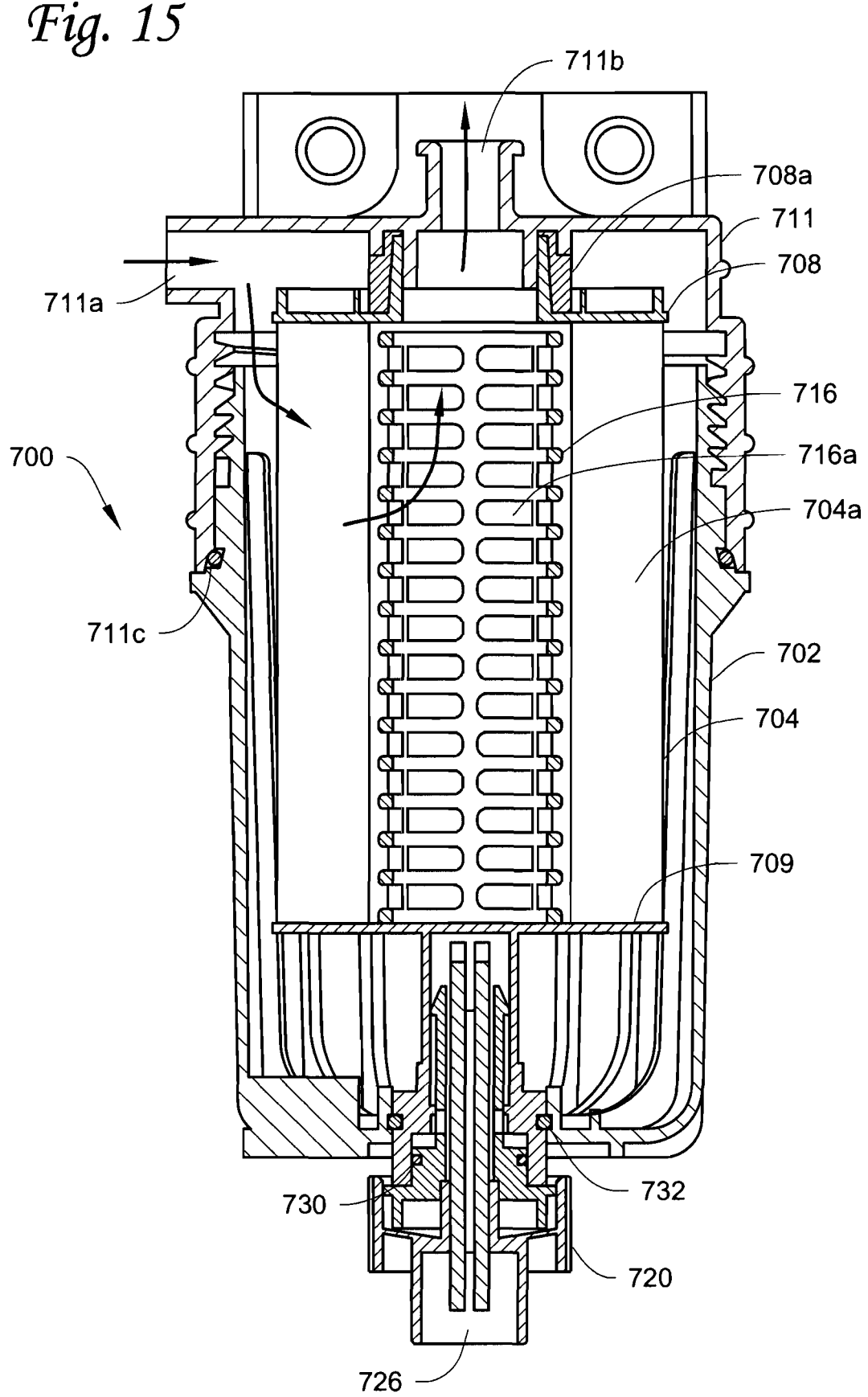

The filter cartridge also includes endplates 708 and 709 connected to the filter element 14. The endplate 708 can sealingly engage the filter head 711 through a gasket seal 708a. As shown in FIG. 15, a center tube 716 extends into the housing 702 and is disposed between the endplates 708, 709. The center tube 716 includes apertures 716a cooperating with the flow path of the fluid filter. The apertures 716a allow filtered fluid passing through the filter media 704a to enter the center tube 716 and exit the opening 711b of the filter head 711.

Turning to the drain valve 720 and filter cartridge connection, the drain valve 720 sealingly engages with the endplate 709 of the filter cartridge. The housing 702 includes a drain opening 702a, and the endplate 709 includes a boss structure 709a that extends away from the filter media 704a and through the drain opening 702a. A seal 732 is provided in a groove on an outer surface of the boss structure 709a. The seal 732 engages an inner annular surface of the drain opening 702a, when the boss structure 709a of the endplate 709 extends through the drain opening 702a.

As shown, the boss structure 709a extends into the drain opening 702a, so that an outer surface of the boss structure 709a sealingly engages with the inner annular surface of the drain opening 702a. In the closed position, the seal 732 provides a fluid tight seal between the boss structure 709a of the endplate 709 and the drain opening 702a.

The drain valve 720 includes a main body and a sealing insert 722. In the closed position, the sealing insert 722 seals with the boss structure 709a of the endplate 709. The sealing insert 722 includes a seal 730 disposed in a groove on an outer annular surface. The seal 732 can provide a fluid tight seal between the sealing insert 722 of the drain valve 720 and the boss structure 709a of the endplate 709, when the sealing insert 722 and the boss structure 709a are engaged.

The drain valve 720 may be tightened to the boss structure 709a of the endplate 709 through a single thread structure. For example, a single thread 709b can be disposed on the inner surface of the boss structure 709a and be engaged with an outer thread on the sealing insert 722. The sealing insert 722 further includes a retention barb 722a that can engage the inner surface of the boss structure 709a. The retention barb 722a has a slightly larger dimension than the space within the inner surface of the boss structure 709a so that an interference fit can be provided when the retention barb 722a and the boss structure 709a are engaged.

Figure 16:
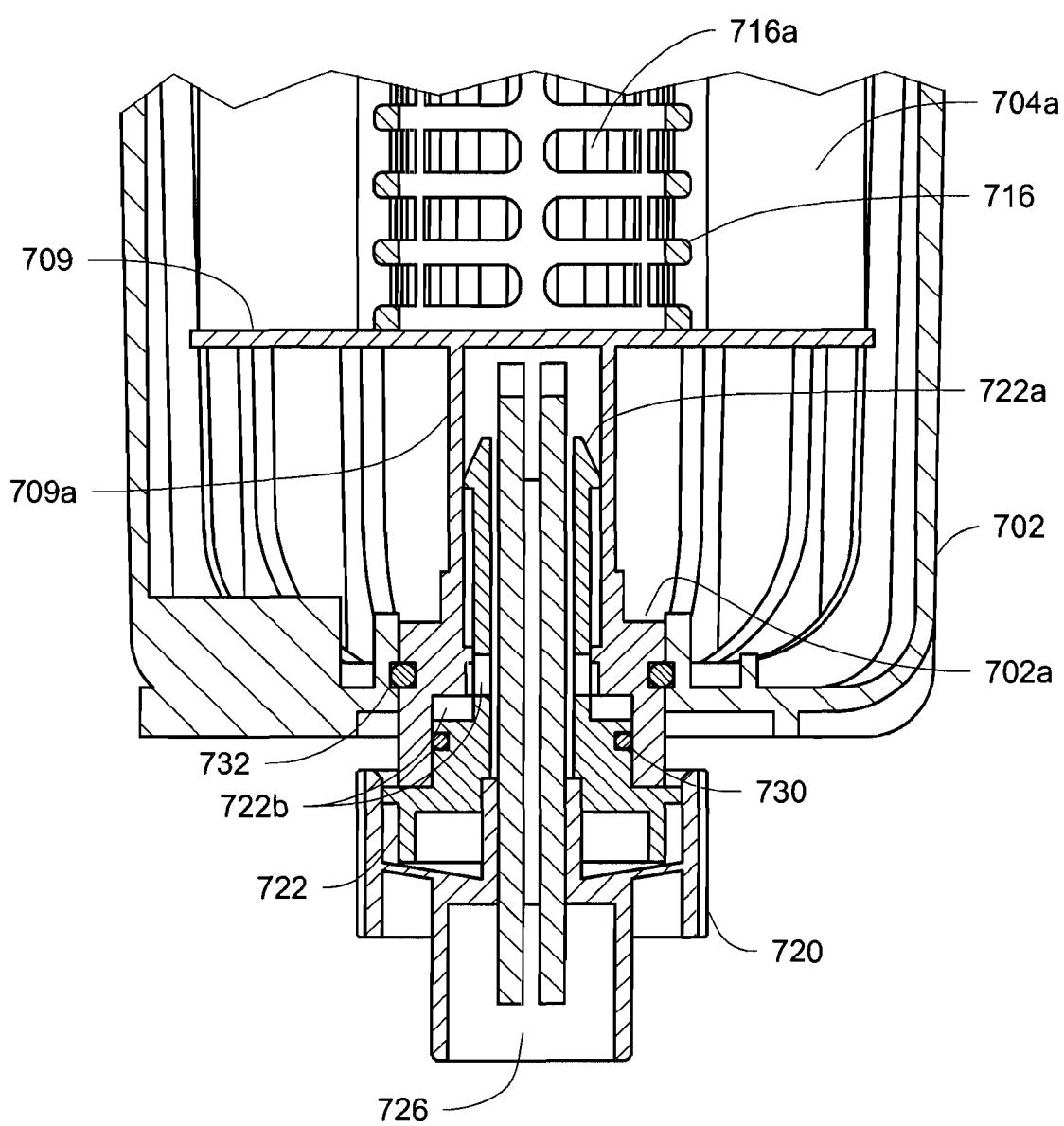

To open the drain valve 720, the seal 730 between the boss structure 709a of the endplate 709 and the sealing insert 722 can be released. For example, the main body of the drain valve 720 may be rotated to disengage the single thread of the boss structure 709a from the single thread of the sealing insert 722. The drain valve 720 may then be pulled from the boss structure 709a of the endplate 709 to release the seal 730. Alternatively, the filter cartridge may be pulled out from the drain valve 720, such that the seal 732 between the outer surface of the boss structure 709a and the inner surface of the drain opening 702a is released. The open configuration allows fluid to flow, for example, through flow openings 709c (see FIGS. 17 and 18) of the boss structure 709a, through a flow opening 722b of the sealing insert 722, and through flow opening 726 of the drain valve 720. FIGS. 15 and 16 show the drain valve 720 in the closed position with seals 730 and 732 engaged.

While the sealing insert 722 of the drain valve 720 and the boss structure 709a of the endplate 709 employ a single thread connection at 709b, it will be appreciated that the fluid filter 700 is not limited to the specific configuration shown and that various connective structures may be employed to connect the drain valve to the endplate. For example, such other configurations may include snap fit, interference fit, and other mechanical connections suitable for achieving a releasable connection between the drain valve and the endplate of the filter cartridge.

As shown, a modified endplate and housing design provides a specific filter cartridge for the fluid filter 700, such that the fluid filter 700 cannot be used unless the correct filter cartridge is installed. That is, the correct filter cartridge must be installed in order to properly seal the fluid filter. The fluid filter also provides for a specific filter cartridge that may be centered using the drain valve, where the drain valve must be opened before the filter cartridge can be serviced.

Figure 17:
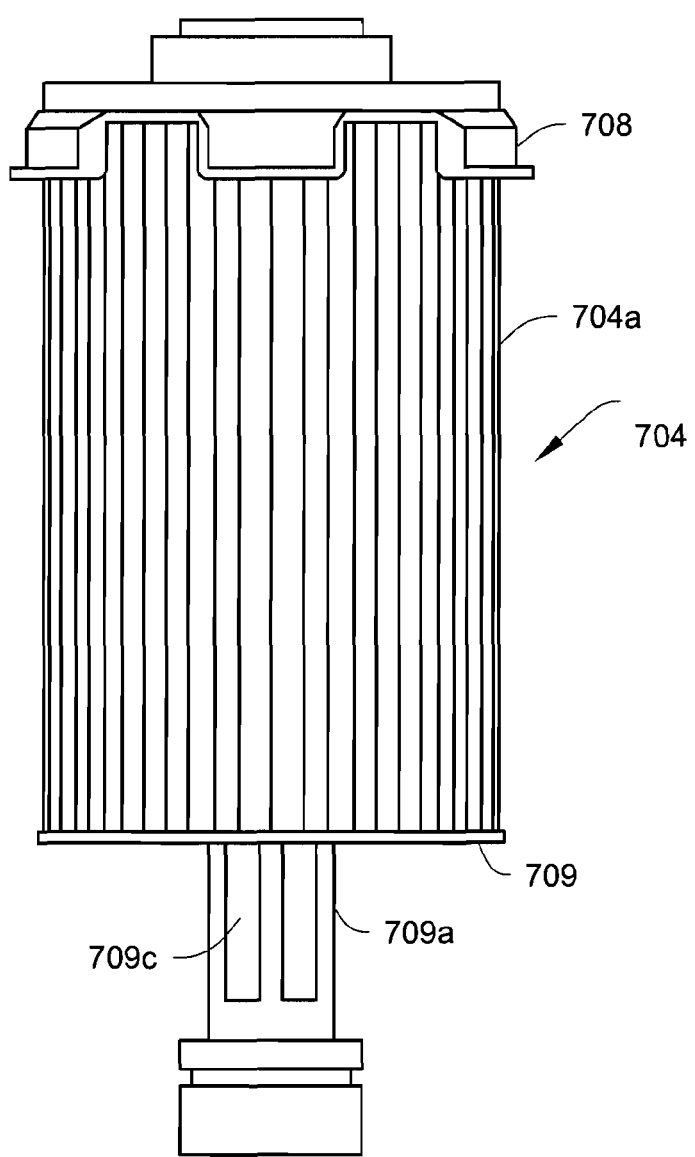
Figure 18:
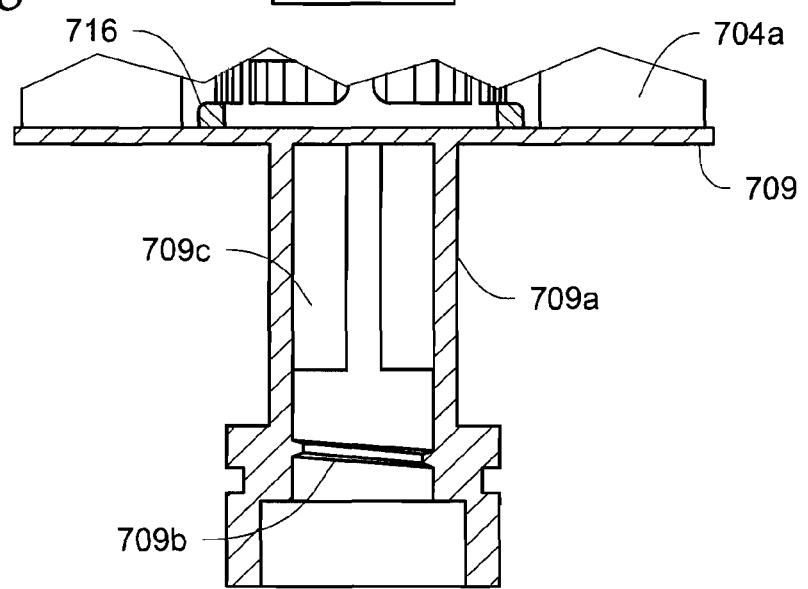

For example, either the drain valve 720 may be rotated and removed to release the seal 730 (i.e. from the bottom of the fluid filter), or the drain valve may be rotated and the filter cartridge is pulled or moved out of sealing engagement with the drain valve (i.e. from the top of the fluid filter). In such a configuration, the fluid filter is opened for draining prior to servicing or replacing the filter cartridge. FIGS. 14-18 show a sealing configuration directly between the drain valve and the filter cartridge with a specific endplate structure. That is, the drain valve 720 can be closed by its structural relationship with the endplate 709, so that a connection to the housing 702 such as a nut is not necessary. FIG. 17 shows an example of the filter cartridge structure, and FIG. 18 shows an example of the endplate 709 structure.

The fluid filters described herein can provide many advantageous, as preventing a clean side of a filter system from becoming contaminated during the filter change process. The fluid filters herein can allow for a more "clean service" since unfiltered fluid is removed before a housing of the filter is opened. As a result, a filter can be provided that is more environment friendly and is more pleasing to customers and users. The fluid filters described herein can also prevent the use of an incorrect filter cartridge to be assembled in the filter, due to a particular connective configuration of the filter and the drain valve, where the fluid filters cannot be used unless the correct filter cartridge is used. Further, the drain valve can be positioned in such a way that it physically prevents opening the filter housing, so as to guide a user or service person to first open the drain valve and perform filter servicing in the correct sequence.

It will be appreciated that the inventive concepts described herein may be applicable to a variety of systems requiring filtration of a working fluid, and including but not limited to fuel and lube filtration systems. As one example only, the fluid filters described herein are useful in HPCR fuel systems. It further will be appreciated that the inventive concepts described herein may be suitably adapted for use in top loading fluid filters (e.g. filter element dropped into housing) and bottom loading fluid filters (e.g. spin on fluid filters).

The invention may be embodied in other forms without departing from the spirit or novel characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. A fluid filter comprising:
   a housing configured to allow entry of fluid to be filtered and to allow exit of filtered fluid;
   a filter cartridge disposed within the housing, the filter cartridge including a filter element disposed between two endplates, the filter element having a filter media configured to filter fluid that enters the housing from an unfiltered side of the filter media to a filtered side of the filter media, such that filtered fluid can exit the housing, the filter cartridge being replaceable; and
   a drain valve engaged with the housing, the drain valve includes a drain hole configured to allow fluid not filtered by the filter cartridge to exit the housing, the drain valve having an open position and a closed position that respectively allows or does not fluid flow through the drain hole, the drain valve is configured to rotate with respect to both the housing and the filter cartridge to open the drain valve into the open position and to close the drain valve into the closed position, the filter cartridge being removable from the housing when the drain valve is in the open position, and the filter cartridge is not removable from the housing when the drain valve is in the closed position,
   wherein the drain valve is sealingly engaged with the housing and indirectly connected with the filter cartridge when the drain valve is in the closed position.

2. The fluid filter of claim 1, wherein the filter cartridge is connected to a center tube, the center tube is connected to a filter head, and the filter head is connected at one end of the housing, the filter head having an inlet configured to allow entry of fluid to be filtered into the housing and an outlet configured to allow exit of filtered fluid out of the housing, the center tube extends into the housing and through the endplates, the center tube includes apertures configured to allow filtered fluid to pass from the filter media and exit the outlet through the center tube, the drain valve being connected to the center tube.

3. The fluid filter of claim 2, wherein the center tube including a wall that separates an inside of the center tube from its end, the wall separates the unfiltered side of the filter media from the filtered side of the filter media.

4. The fluid filter of claim 2, wherein the center tube includes an extended boss section and the drain valve includes a head portion, the extended boss section is receivable of the head portion, the extended boss section and the head portion being releasably connected and in a sealing engagement when the drain valve is in the closed position, the extended boss section and the head portion retaining the filter head onto the housing when connected.

5. The fluid filter of claim 1, further comprising a lever connected to the drain valve and configured to move the drain valve into any of the open and closed positions, the lever extends beyond an outer dimension of the fluid filter when the drain valve is in the closed position, the lever does not extend beyond the outer dimension of the housing when the drain valve is in the open position.

6. The fluid filter of claim 1, further comprising an actuator connected to the drain valve, configured to physically block removal of the fluid filter when the drain valve is in the closed position.

7. The fluid filter of claim 6, wherein the drain valve is sealingly engaged with the housing and directly connected with one endplate of the filter cartridge, when the drain valve is in the closed position.

8. The fluid filter of claim 1, wherein the drain valve is engaged with the filter cartridge, and the drain valve, housing, and filter cartridge being structurally arranged, such that the drain valve must be opened and released from engagement with the filter cartridge before the filter cartridge can be replaced.

9. The fluid filter of claim 1, wherein the drain valve, housing, and filter cartridge being structurally arranged, such that the drain valve must be opened and released from engagement with the housing before the filter cartridge can be replaced.

10. A fluid filter comprising:
a housing configured to allow entry of fluid to be filtered and to allow exit of filtered fluid:
a filter cartridge disposed within the housing, the filter cartridge including a filter element disposed between two endplates, the filter element having a filter media configured to filter fluid that enters the housing from an unfiltered side of the filter media to a filtered side of the filter media, such that filtered fluid can exit the housing, the filter cartridge being replaceable; and a drain valve engaged with the housing, the drain valve includes a drain hole configured to allow fluid not filtered by the filter cartridge to exit the housing, the drain valve having an open position and a closed position that respectively allows or does not fluid flow through the drain hole, the drain valve is configured to rotate with respect to both the housing and the filter cartridge to open the drain valve into the open position and to close the drain valve into the closed position, the filter cartridge being removable from the housing when the drain valve is in the open position, and the filter cartridge is not removable from the housing when the drain valve is in the closed position,
wherein the drain valve is sealingly engaged with one endplate of the filter cartridge and directly connected with the housing, when the drain valve is in the closed position.

11. The fluid filter of claim 10, wherein the endplate that sealingly engages with the drain valve includes a boss structure and the drain valve includes a head portion, the endplate that sealingly engages with the drain valve extending away from the filter media and having a pocket that is receivable of the head portion.

12. The fluid filter of claim 11, wherein the housing includes a boss structure extending toward the endplate that sealingly engages with the drain valve, the boss structure of the housing having a pocket that is at least partially receivable of the boss structure of the endplate that sealingly engages with the drain valve, the pocket configured to locate the boss structure of the endplate.

13. The fluid filter of claim 12, wherein the boss structures are offset relative to a center axis of the fluid filter.

14. The fluid filter of claim 10, wherein the drain valve is sealingly engaged with the housing when the drain valve is in the closed position.

15. A fluid filter comprising:
a housing configured to allow entry of fluid to be filtered and to allow exit of filtered fluid;
a filter cartridge disposed within the housing, the filter cartridge including a filter element disposed between two endplates, the filter element having a filter media configured to filter fluid that enters the housing from an unfiltered side of the filter media to a filtered side of the filter media, such that filtered fluid can exit the housing, the filter cartridge being replaceable; and a drain valve engaged with the housing, the drain valve includes a drain hole configured to allow fluid not filtered by the filter cartridge to exit the housing, the drain valve having an open position and a closed position that respectively allows or does not fluid flow through the drain hole, the drain valve is configured to rotate with respect to both the housing and the filter cartridge to open the drain valve into the open position and to close the drain valve into the closed position, the filter cartridge being removable from the housing when the drain valve is in the open position, and the filter cartridge is not removable from the housing when the drain valve is in the closed position,
wherein the drain valve is sealingly engaged with the housing and directly connected with one endplate of the filter cartridge, when the drain valve is in the closed position,
wherein the endplate that directly connects with the drain valve includes boss structure extending away from the filter media and the housing includes a boss structure extends toward the endplate that directly connects with the drain valve, the boss structure of the housing is receivable of the boss structure of the endplate forms a pocket.

16. The fluid filter of claim 15, wherein the boss structure of the housing includes a window configured as an access to the drain hole of the drain valve when the drain valve is in the open position.

17. The fluid filter of claim 15, wherein the boss structure of the endplate that directly connects with the drain valve extends through the housing and sealingly engages the housing.

18. The fluid filter of claim 15, wherein the housing includes an outer boss structure having a pocket receivable of the drain valve and sealingly engaging the drain valve when the drain valve is in the closed position.

19. A fluid filter comprising:
a housing configured to allow entry of fluid to be filtered and to allow exit of filtered fluid:
a filter cartridge disposed within the housing, the filter cartridge including a filter element disposed between two endplates, the filter element having a filter media configured to filter fluid that enters the housing from an unfiltered side of the filter media to a filtered side of the filter media, such that filtered fluid can exit the housing, the filter cartridge being replaceable; and a drain valve engaged with the housing, the drain valve includes a drain hole configured to allow fluid not filtered by the filter cartridge to exit the housing, the drain valve having an open position and a closed position that respectively allows or does not fluid flow through the drain hole, the drain valve is configured to rotate with respect to both the housing and the filter cartridge to open the drain valve into the open position and to close the drain valve into the closed position, the filter cartridge being removable from the housing when the drain valve is in the open position, and the filter cartridge is not removable from the housing when the drain valve is in the closed position, wherein the drain valve is directly connected with and sealingly engaged with one endplate of the filter cartridge, and the one endplate of the filter cartridge that connects and sealingly engages with the drain valve is sealingly engaged with the housing.

* * * * *